United States Patent [19]

Ohsato et al.

[11] Patent Number: 5,442,615
[45] Date of Patent: Aug. 15, 1995

[54] OPTICAL PLATE FOR CORRECTING COMATIC ABERRATION

[75] Inventors: Kiyoshi Ohsato, Chiba; Naoya Eguchi; Kamon Uemura, both of Tokyo, all of Japan

[73] Assignee: Sony Corporation, Tokyo, Japan

[21] Appl. No.: 90,115

[22] PCT Filed: Nov. 20, 1992

[86] PCT No.: PCT/JP92/01516

§ 371 Date: Aug. 26, 1993

§ 102(e) Date: Aug. 26, 1993

[87] PCT Pub. No.: WO93/10528

PCT Pub. Date: May 27, 1993

[30] Foreign Application Priority Data

Nov. 20, 1991 [JP] Japan ................. 3-332449
Oct. 16, 1992 [JP] Japan ................. 4-278931

[51] Int. Cl.⁶ .............................................. G11B 7/09
[52] U.S. Cl. ........................... 369/100; 369/44.32; 369/58; 369/112
[58] Field of Search ................ 369/100, 44.32, 54, 369/58, 44.14, 44.12, 112, 44.41, 44.13, 105

[56] References Cited

U.S. PATENT DOCUMENTS

| | | | |
|---|---|---|---|
| 4,564,757 | 1/1986 | Labudde et al. | 250/239 |
| 4,780,865 | 10/1988 | Yamakawa | 269/44.32 |
| 4,807,212 | 2/1989 | Kaneda et al. | 369/112 |
| 4,847,478 | 7/1989 | Sugiura | 369/44.24 |
| 5,027,336 | 6/1991 | Sugiura | 369/44.13 |

FOREIGN PATENT DOCUMENTS

| | | |
|---|---|---|
| 0452953A2 | 10/1991 | European Pat. Off. ..... G11B 7/135 |
| 60-121546 | 6/1985 | Japan . |
| 61-177650 | 8/1986 | Japan . |
| 63-44329 | 2/1988 | Japan . |
| 2-40141 | 2/1990 | Japan . |

OTHER PUBLICATIONS

Patent Abstracts of Japan, vol. 12, No. 1978 (P–708), 26 May 1988 & JP-A-62 287 484 (Sony Corp.), 14 Dec. 1987.

*Primary Examiner*—Georgia Y. Epps
*Assistant Examiner*—Kim-Kwok Chu
*Attorney, Agent, or Firm*—W. Patrick Benotsson; Limbach & Limbach

[57] ABSTRACT

A disc reproducing apparatus such ah as video disc players and compact disc players, etc., surely corrects skew of an optical disc and reproduces recorded information even though the recording density is high. The disc reproducing apparatus has a plate-like transparent member interposed in a focused light path of the light beam so as to tilt the transparent member and cancel any comatic aberration. A light spot correction means having the transparent parallel flat plate and at least a coil and a magnet changing the inclination of the flat plate is arranged in a light path of a light beam, thus comatic aberration due to skew of the optical disc is surely and simply corrected.

5 Claims, 41 Drawing Sheets

SKEW=0deg

SKEW=0deg

SKEW=0.1 deg

SKEW=0.1 deg

SKEW=0.2deg

SKEW=0.2deg

SKEW=0.3deg

SKEW=0.3deg

SKEW=0deg

SKEW=0deg

SKEW=0.3deg

SKEW=0.3deg

FIG. 10(A1) LINEAR VALUE BEFORE CORRECTION

FIG. 10(B1) LOGARITHMIC VALUE BEFORE CORRECTION

FIG. 10(A2) LINEAR VALUE AFTER CORRECTION

FIG. 10(B2) LOGARITHMIC VALUE AFTER CORRECTION

FIG. 29(A)  FIG. 29(B)  FIG. 29(C)

OPTICAL PLATE FOR CORRECTING COMATIC ABERRATION

TECHNICAL FIELD

The present invention relates to an optical disc apparatus and more particularly, is suitable to apply to, for example, a computer memory, music information recording apparatus, and an image information recording apparatus.

BACKGROUND ART

Nowadays information expands, so it is necessary to use a high density optical disc as a recording or memorizing device of music and image information of the computer memories, compact discs, video discs and the like.

As a one method of making high density, there is a process of enlarging an open number NA of the object lens of an optical pick up optically recording and reproducing information more than that of the conventional compact discs and video discs.

When the open or aperture number NA of the object lens is enlarged as described above, a comatic aberration of a spot focussed on the optical disc is enlarged in case the optical disc skewed. As a result, for example reproducing wave form strain is enlarge or increases, symbols are connected, and crosstalk is generated between memory tracks on the optical disc.

When a shape of the optical spot on an information recording surface of the optical disc reproducing apparently changes to an oval one along not only a radial direction but also a recording track direction, and further a long axis direction of the oval light spot coincides with an extending direction of the recording track, between-signals-interference is generated in a reproduced signal. Consequently, two pits of sequential pits are made near to each other in a high density recording resulting in an impossibility of correct or effective reproducing the recorded information.

On the contrary, when the long axis of the oval is coincided with a radial direction of the optical disc, crosstalk is generated between recording tracks. Consequently, when the recording is done at a high density narrowing the track pitch, it becomes impossible to correctly reproduce recorded information.

In addition, in the optical disc reproducing apparatus, a comatic aberration makes a point spread function and a line spread function of the light spot non-symmetrical. So, it becomes impossible to effectively correct any reproducing wave form strain by means of, for example, an ordinal fixed three-tap type equalizer.

That is, when the optical disc is used as a compact disc, for example, it has a transparent substrate of a thickness of about 1.2 mm. Light beam is shone and focussed on the information recording surface through the transparent substrate, and, for example, a reflected light from the recording surface reproduces information signals.

Consequently, when the information recording surface of the optical disc is skewed or inclined relative to light axis of the object lens, comatic aberration is generated proportioning to about three power of the aperture number NA and about one power of skew value.

The comatic aberration is expressed by Zaidel (phonetic)aberration coefficient equation as follows.

$$W31d = \frac{Td}{2} \frac{(Nd^2 - 1) Nd^2 \sin\theta d \cos\theta d}{(Nd^2 - \sin^2\theta d)^{5/2}} NAO \quad (1)$$

Equation (1) is transferred to the following equation (2), $$W31d = \frac{Td}{2} \frac{Nd^2 - 1}{2} NAd^3\theta d \quad (2)$$

wherein, W31d is a ternary comatic aberration, Td is a thickness of the transparent substrate of the optical disc, Nd is a refractive ratio of the transparent substrate of the optical disc, and NAO is an aperture number of the object lens.

When NA is 0.6 and the aperture number is so large as 1.33 times of the compact disc, the comatic aberration generated is 2.37 times if the disc skew value is identical with that (aperture number NA=0.45) of the compact disc. In other words, when NA=0.45 of the compact disc, it is supposed that 0.6° of the disc skew is permittable value of the disc skew value becomes so small considerably as of 0.25°.

By the way, it is practically difficult to make any disc skew completely remove or small because that warp or wave of the optical disc along its radial direction and tangential direction (circumferential direction), and inclination of the optical disc owing to the tilt of the disc mounting surface from the mounting standard surface.

When a wave face is strained owing to comatic aberration and the like, light strength distribution or spread function of the light spot focussed on the optical disc is made of non-symmetrical.

FIGS. 1(A), 1(B) to FIGS. 4(A), 4(B) respectively show a point spread function and line spread function of the light spot on the optical disc when the optical disc is tilted by 0°, 0.1°, 0.2° and 0.3°. Apparently from the figures, the larger the optical disc skews, the larger the value of non-symmetricity because strain of wave face rises the side robes of the light strength of the light spot in a manner of symmetrically.

Upwardly rising shown in FIG. 1(A) to FIG. 4(A) display linearly light strength of respective positions of the light spot on the disc flat surface within a shone surface of the spot. Curves shown in FIG. 1(B) to FIG. 4(B) display functionally light strength 0, −10, −20, −30, −40, −50 (axis of ordinate (dB)) at respective positions −1.5, −1.0, −0.5, 0, 0.5, 1.0, 1.5 (axis of abscissa (μm)) of an imaginary line passing through a center of the light spot.

As described above, the disc skew along the tangential direction of the optical disc generates owing to rising of side robes of light strength distribution or spread functions of a light spot, and as a result interference between symbols increase considerably.

FIG. 5(A) and FIG. 6(A), respectively show examples of digital signals of reproducing signal wave forms (EFM reproduced wave forms) produced when skew along tangential direction (circumferential direction of the disc) is 0° and 0.3°. Comparing to each other of both examples, it is apparent that the case in which the disc skew is so large as 0.3° has a larger wave form strain of EFM reproducing wave forms comparing to the case of 0° resulting in a closing of eyepattern and a difficulty of picking-up correctly signals.

FIG. 5(A) and FIG. 6(A) show input signals of a fixed three-tap type equalizer of the optical disc apparatus, and FIG. 5(B) and FIG. 6(B) show output signals of the fixed three-tap type equalizer.

When analog signals are used and the disc skew along a tangential direction (circumferential direction) increases, C/N decreases and group delay phenomenon is generated. In particular, in case of video discs, there is a problem of appearing an uneven color on the display.

When a disc skew along a radial direction is generated, non-symmetrical spread function of the light spot or rising of side robes is happened resulting in large crosstalk because the wrong neighboring track is reproduced.

As shown in FIG. 7, concerning the crosstalk value of the disc skew along its radial direction, when the disc skew is ±0.3°, its crosstalk increases by 15 (dB) comparing to the case in which the disc skew is 0°.

That is, in anyone of the cases of digital signals and analog signals, when a disc skew along a radial direction increases, crosstalk increases and C/N decreases. In particular, concerning a video disc, and etc., there is a problem of appearing of horizontal synchronizing signals of the neighboring track (horizontal synchronizing signal of the neighboring track flows slowly horizontally).

In order to solve such problems of the conventional optical disc apparatus, a method controls an inclination of whole structure of an optical pick up in order to correct the skew of the disc. The conventional apparatus has a movable portion for controlling such inclination of the pick up and the movable portion is large in size and in weight, so it is difficult to have a quick and good responsibility.

In this connection, skew of about 0.1° to 0.2° generated during a rotation of the optical disc has a frequency so high as about several tenth to hundred several tenth (Hz), so that it is very difficult to control the heavy optical pick up and correct such skew of the optical disc.

In addition, in accordance with the conventional apparatus a skew servo motor of an equalizer shown in FIG. 8 is used to tilt the whole structure of an optical pick up relative to the optical disc along its radial direction in order to keep a light axis perpendicular to a surface of the optical disc. Thus, the skew servo motor functioned along only a radial skew direction electrically corrects such reproducing wave form strain.

The three-tap type equalizer EQ consisting of an equalizer of a transversal filter type of an equalizer fixed three-tap type delay circuit has delay circuits DL1 and DL2, fixed gain amplifying circuits AM1, AM2 and AM3, and adder circuit AD1. The delay circuits DL1 and DL2 are adapted to sequentially give unit delay value $\tau$ to input signals. Consequently, three delay signals h $(t-\tau_1)$, h (t) and h $(t+\tau_1)$, respectively having timings differed sequentially by an unit delay value $\tau_1$ are multiplied by weighting coefficients a, 1 and a in the amplifying circuits AM1, AM2 and AM3, then they are added in an adder circuit AD1. The resultant added output $H(t)=ah(t-\tau_1)+h(t)+ah(t+\tau_1)$ are outputted to the equalizer EQ.

In the conventional construction, considering first it on a frequency axis, when a modulation transfer function (MTF) expressing a frequency (defined by spacial frequency) characteristic of the optical pick up displays the feature shown in FIG. 9(A) at a skew angle 0°, the MTF is corrected by the three-tap type equalizer EQ having a right rising frequency characteristic shown in FIG. 9(C). Thus, as shown in FIG. 9(B), the frequency characteristic is improved by gain rises about a half of cut-off frequency.

When transmission function of the three-tap type equalizer EQ is $H(t)=-ah(t-\tau_1)+h(t)-ah(t+\tau_1)$, it is expressed by using a spacial frequency f, an equation $G(\omega)=1-2$ a cos $(*_1 \omega)$ $(\omega=2\pi f)$.

As shown in FIG. 10(A1) to FIG. 10(C), an improvement function of a frequency characteristic of this three-tap type equalizer EQ can be explained as an overlapping of curves of spread function of the light spot. That is, when line spread function of the light spot before correction is expressed as linear value of line spread function curve h(t), it is a symmetrical spread or distribution curve with a center of a time point t as shown in FIG. 10(A1). It can be expressed as logarithmic value thereof as shown in FIG. 10(B). Similarly, line spread function h(t) of the light spot after correction can be expressed by spread curves shown in FIG. 10(A2) and FIG. 10(B2).

However, light spots must be obtained at the output terminals of the three-tap type equalizer EQ, which spots having the line spread functions expressed by $H(t)=-ah(t-\tau_1)+h(t)-ah(t+\tau_1)$. It can be determined as shown in FIG. 10(C) of a spread function H(t) (see FIG. 10(B1)) overlapped three line spread functions h(t), $-ah(t-\tau_1)$ and $-ah(t+\tau_1)$.

The overlapped line spread function curve h(t) is adapted to subtract two line spread function curves $-ah$ $(t-\tau_1)$ and $-ah(t+\tau_1)$ having symmetrical side robes from the line spread function h(t). As a result, the resultant spread function curve has rising and falling portions more abrupt than that of line spread function curve h(t) by the amount subtracted. It is said that the frequency characteristic is improved to be steep.

However, when a disc skew is happened, as shown in FIGS. 11(A1) and 11(B1), 11(A2) and 11(B2) and 11(C) corresponding to FIGS. 10(A1) and 10(B1), 10(A2) and 10(B2) and 10(C), the line spread function curves $-ah(t-\tau_1)$, h(t) and $-ah(t+\tau_1)$ before correction have non-symmetrical shapes provided with a rising side robes.

Consequently, overlapping these spread function curves, the line spread function curves H(t) after correction resembles to substantially to the line spread function curve h(t) before correction.

As a result, it is recognized that it is impossible to obtain correction effect of the disc skew happened by means of the three-tap type equalizer EQ.

As described above, the conventional optical disc apparatus has the following problems.

First, the structure for mechanically tilting the optical pick up is complicated and decreasing the manufacturing cost of the structure is difficult.

Second, the structure for mechanically tilting the optical pick up is heavy and it is impossible to expect a high speed or quick response.

Third, it is impossible to do skew servo along the tangential direction or circumferential direction.

Fourth, the three-tap type equalizer can not sufficiently correct reproducing wave form strain due to disc skew correct reproducing wave form strain due to disc skew.

DISCLOSURE OF INVENTION

The present invention has been achieved after studying the problems above of the conventional optical disc apparatus. An object of the present invention is to solve effectively such problems and provides an optical disc apparatus enabling to record information at a more high density.

According to the first aspect of the present invention to solve these problems above, the optical disc apparatus has an optical disc 2 in which a light beam LA1 incident through the surface made of a transparent member 3 and focussed on the information recording surface 4 is used to record a desired information in the information recording surface or reproduce information recorded in the information recording surface 4, a light source 6 ejecting a light beam LA1, an object lens 8 for focussing the light beam LA1 ejected or emitted from the light source 6 on the information recording surface 4, and a plate-like transparent member 20 interposed in the focusing light beam between the light source 6 and the object lens 8, or the object lens 8 and the optical disc 2, wherein an inclination of the transparent member 20 changes according to the inclination or skew of the optical disc 2 in order to correct the shape of light spot of light beam formed on the information recording surface 4.

When the plate-like transparent member 11 interposed in the focusing light beam between the light source 6 and the object lens 8, or the object lens 8 and the optical disc 2 is inclined according to the inclination or skew of the optical disc 2, it is possible to cancel any comatic aberration of the optical disc 2 through a comatic aberration of the transparent member 11.

According to the second aspect of the present invention, as shown in FIG. 19 depicting the basic composition of it, the optical disc apparatus 41 for making the optical beam from the light source 46 focussed on the information recording surface 44 of the optical disc 42 through the object lens 51 and through the surface transparent member 43 of the transparent substrate and the like of the optical disc 42 in order to record a desired information in, for example, the information recording surface 44, or reproduce information recorded in the information recording surface 44, has a light beam spot correction means 53 formed in a light passage of the light beam.

The correction means 53 has, for example as shown in FIG. 21, a transparent parallel flat plate 51 placed in the light beam passage, and at least one pair of a coil 59 and a magnet 60 magnetically related to each other, which pair being placed on a side of the transparent parallel flat plate 54 or a side of fixed member opposed to the plate 54.

According to the inclination of the optical disc 42 relative to the basis arrangement surface, current to the coil 59 is controlled and inclination of the transparent flat plate 54 is controlled in order to correct the shape of optical beam spot projected on the information recording surface 44 of the optical disc 42.

According to the third aspect of the present invention, the optical disc apparatus 41, for making a light beam from the light source 46 shone and focussed on the information recording surface 44 of the optical disc 42 through the object lens 51 and through the surface transparent member 44 of the transparent substrate and the like of the optical disc 42, has the correction means 59 for light beam spot placed in the light beam passage.

As shown in FIG. 22 depicting a perspective of an important part of an example of the correction means 53, the correction means 53 has a transparent parallel flat plate 54 held so as to rotate around the first axis and the second axis (X axis and Z axis) crossing perpendicularly along the standard surface of arrangement of the optical disc 42 and in the tangential direction and the radial direction, and at least two pairs of coils 59 and magnets 60 magnetically and mutually related and placed on a side of the transparent parallel flat plate 54 or a side of the fixing member opposed to the plate 54.

A current to the coil 59 is controlled according to an inclination of the optical disc 42 from the arrangement standard surface and control the inclination of the transparent parallel flat plate 54 in order to correct the shape of a light beam spot on the information recording surface 44 of the optical disc 42.

According to the fourth aspect of the present invention, the optical disc apparatus 41 for making a light beam from the light source 46 shone and focussed on the information recording surface 44 of the optical disc apparatus through the object lens 51 and the surface transparent member 43 such as the transparent substrate and the like of the optical disc 44 has the correction means 53 for shape of the light beam spot.

The correction means 53 has a transparent parallel flat plate 54 rotatably held around at least the predetermined first axis along the standard surface of arrangement of the optical disc 42, and at least one pair of a coil 59 and[a magnet 60 magnetically and mutually related and placed respectively on a side of the transparent parallel flat plate 54 or another side of the fixed member opposed to the side of the plate 54.

In addition, controlling a current for the coil 59 according to the rotation direction of the optical disc 42 around the first axis from the standard surface of arrangement of the optical disc 42, for example, or an inclination of the optical disc 42 along its radial direction in order to adjust the slantation of the transparent parallel flat plate 54, consequently the shape of light beam spot on the information recording surface 44 of the optical disc 42 along the second axis perpendicular to the first axis.

While, the optical disc apparatus of the present invention has a reproducing means for converting the light or beam reflected from the optical disc 42 to an electric signal by means of two-division system method in order to detect an inclination value of the optical disc 42 along a rotation direction around the second axis perpendicular to the first axis and along the arrangement standard surface or, for example, along its tangential direction, filtering the electric signal on the basis of filtering coefficient restricted according to the value of inclination or skew of the optical disc 42, outputting the result of filtering, and reproducing information recorded in the optical disc 42 according to the result.

Fifth aspect of the present invention resides that the filtering means consists of multi-step transversal filters, and the delay value $\tau_2$ of the delay circuit of the transversal filter is restricted by the following equation (3), $$1.22 \frac{\lambda}{2NA} \leq \tau_2 \leq 2.33 \frac{\lambda}{2NA} \qquad (3)$$

wherein, $\lambda$ is wave length of light source, and NA is an aperture number of the object lens.

According to the fifth aspect of the present invention, as shown in FIG. 22 depicting a perspective of one example of the correction means, the correction means 53 has a photo-reflector 64 for detecting an inclination angle of the transparent parallel flat plate 54.

According to the present invention, placing the light beam spot correction means 53 having the transparent parallel flat plate 54 placed in the light beam passage so as to change its inclination according to an inclination or skew of the optical disc 42 in order to cancel comatic aberration and correct strain of spot focussed on the optical disc. As a result, the inclination of the transparent parallel flat plate 54 along the radial direction and tangential direction is controlled and corrected. The inclination of the transparent parallel flat plate 54 along, for example, a radial direction is corrected by mechanical and optical procedure and the inclination along the tangential direction is corrected by electrical steps so as to correct reproduced wave form strain by electric signal processing.

As described above, according to the present invention, at least one inclination of the transparent parallel flat plate 54 along the radial direction or tangential direction of the optical disc 42 is controlled by a small and light movement of the optical disc apparatus, comparing to a mechanism for inclining whole structure of the optical pick up, so it is possible to fasten its operative speed and simplify the construction of the optical disc apparatus.

Then, the inclination control of the transparent parallel flat plate 54 can be controlled by a magnetic mechanism of a coil 59 and magnet 60, thus its movement is made further hasten.

Further, for example, an inclination of the optical disc along the radial direction is done by the optical beam spot correction means 53 of mechanical and optical method, and concerning the inclination along the tangential direction, the correction is carried out by electric signal processing of reproduced wave form strain attaining a miniaturization and making light of the mechanical and optical structure.

According to the disc inclination correction device of the present invention, a plate-like transparent member is inserted in a focusing light beam passage, inclined, and cancel a comatic aberration generated due to skew of the optical disc. As a result, even the inclination of the optical disc is large, the optical disc apparatus of a simple structure can surely prevent any comatic aberration in the information recording surface improving correspondingly its recording density and record and reproduce surely recorded information.

According to the optical disc apparatus of the present invention, an optical compensation plate or electrical compensation circuit is provided, so even though an aperture number NA of the object lens is large it is possible to correct any comatic aberration generated by a disc skew or electrically correct strain in reproduced wave form. Consequently, it is possible to provide a high density optical disc system of very economic and high reliability.

Additionally, it is possible to enlarge a permittable value of the disc skew, so that the high density discs can be manufactured at a low cost.

BRIEF DESCRIPTION OF DRAWINGS

FIGS. 29(A) to 29(C) are outlines of the detection sensor for inclination angle of the transparent parallel flat plate.

BEST MODE FOR CARRYING OUT THE INVENTION

Various embodiments of the present invention will be explained in detail with reference to the accompanying drawings.

(1) First Embodiment

Figure 12:
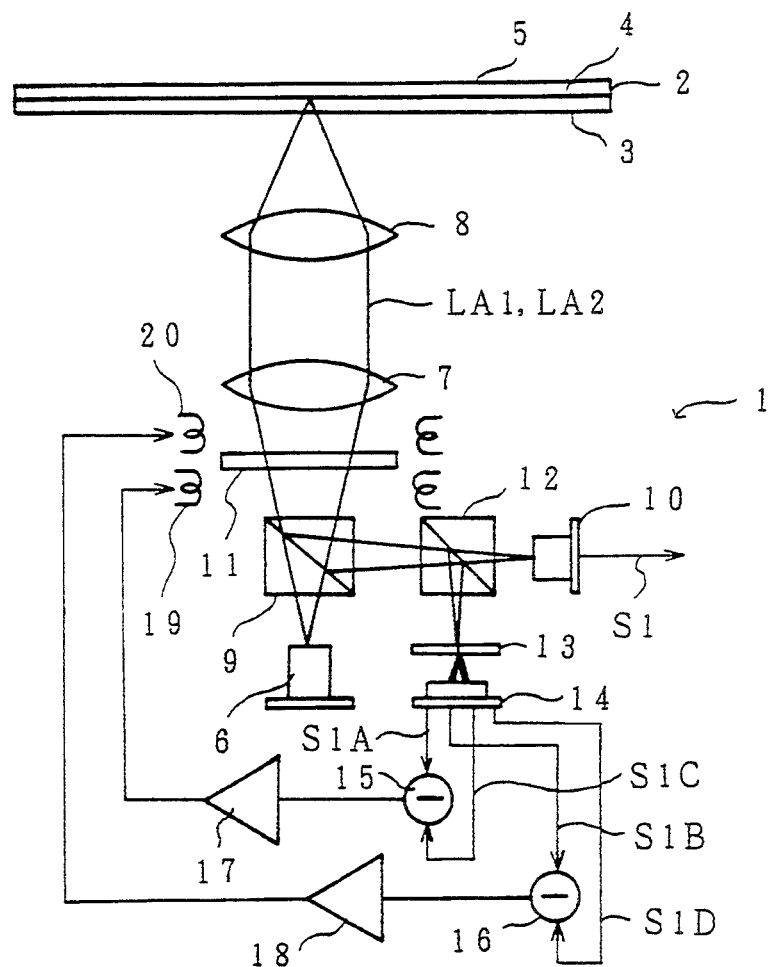
FIG. 12 is a systematic view of the first embodiment of the optical disc apparatus according to the present invention.

In FIG. 12, 1 shows a whole structure of the disc reproducing apparatus reproducing recorded information from the optical disc 2. The optical disc 2 has a transparent substrate 3 provided with an information recording surface 4 formed thereon and the information recording surface 4 is protected by a protecting membrane 5.

Optical or light beams LA1 entered from a side of the transparent substrate 3 are focused onto the information recording surface 4 of the optical disc 2 resulting in a reflected light beams LA2. Being based on the reflected light beam LA2, the recorded information on the information recording surface 4 is adapted to be reproduced.

In a disc reproducing apparatus 1, the light beams LA1 are radiated from a laser source 6, the light beams LA1 are transferred to parallel light beams through a collimator lens 7, and the light beams LA1 are irradiated or exit to the optical disc 2 through an object lens 8.

Further, in the disc reproducing apparatus 1, the reflected light beams LA2 reflected on the optical disc 2 are led to a beam splitter 9 through, on the contrary, the object lens 8 and the collimator 7 in order. Through the beam splitter 9, the reflected light beams LA2 are separated from the light beams LA1 and led to a light receiving element 10.

As described above, the disc reproducing apparatus 1 extracts clock signals from output signals S1 of the light receiving element 10 and carries out a processing on the standard of the clock signals in order to reproduce the recorded information on the information recording surface 4. Furthermore, the object lens 8 of the disc reproducing apparatus 1 is adapted to be servo-controlled so as to move up-and-down and left-and-right on the basis of the output signal S1 of the light receiving element 10 in order to prevent the disc reproducing apparatus 1 from generating tracking-errors and focusing-errors.

The disc reproducing apparatus 1 has a parallel flat plate 11 made of transparent material and placed between the collimator 7 and the beam splitter 9 in order to correct a comatic aberration by tilting the parallel flat plate 11.

The value of the comatic aberration can be evaluated by a comatic aberration coefficient W31d. The comatic aberration coefficient W31d to be generated when the optical disc 2 tilts is expressed by the following equation, $$W31d = \frac{Td}{2} \cdot \frac{(Nd^2 - 1) Nd^2 \sin\theta d \cos\theta d}{(Nd^2 - \sin^2\theta d)} NA0^3 \quad (4)$$

$$= \frac{Td}{2} \cdot \frac{Nd^2 - 1}{Nd^3} NA0^3 \theta d$$

here, Nd is a refractive index of the transparent substrate 4, Td is a thickness of the transparent substrate 4, $\theta d$ is an inclination or angle of the optical disc 2, and NA0 is an aperture of the object lens 8.

According to the equation (1), when the inclination of the optical disc 2 is very small, it is understood that the value of a comatic aberration changes linearly following to the inclination.

When the parallel flat plate 11 inserted in a bundled or focussed light beam passage according to the present invention, a comatic aberration is generated, and its comatic aberration coefficient W31c is shown by the following equation (5), $$W31c \approx \frac{Tc}{2} \cdot \frac{Nc^2 - 1}{Nc^3} NAc^3 \theta c \quad (5)$$

here, Nc is a refractive index of the parallel flat plate 11, Tc is a thickness of the parallel flat plate 11, $\theta c$ is an inclination of the parallel flat plate 11, and NAc is an aperture number of the collimator.

Accordingly, when the parallel flat plate 11 is inclined to control the value of a comatic aberration, it is possible to cancel the comatic aberration generated in the optical disc 2 and keep the spot shape on the information recording surface 4 always a circle.

Figure 13:
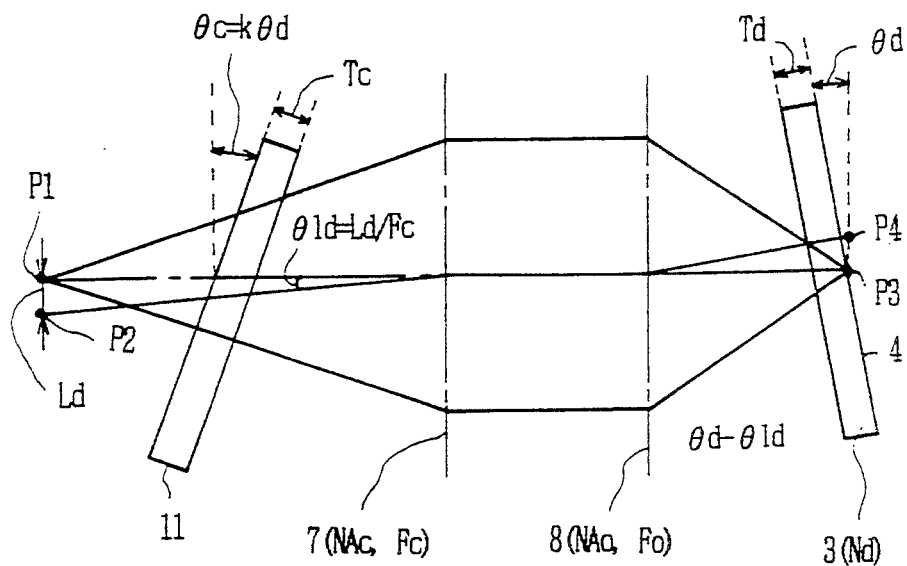
FIG. 13 is a diagram for explaining a comatic aberration correction principle shown in FIG. 12.

In this case, as shown in FIG. 13, when the parallel flat plate 11 is inclined, it seems that an irradiating point P1 of the optical beam LA1 is moved to the point P2 and an optical path changes. Consequently, at the side of the optical disc 2, a focussing position of the light beam LA1 is moved from a point P3 to another one P4.

It is possible, that is, to cancel the comatic aberration by inclining the parallel flat plate 11 even when the optical disc 2 is inclined.

In this case, a moved distance Ld of the irradiating point can be expressed by the following equation (7), $$Ld = Tc \sin\theta c \left[ 1 - \sqrt{\frac{1 - \sin^2\theta c}{Nc^2 - \sin^2\theta c}} \right] \approx Tc \frac{Nc - 1}{Nc} \theta c \quad (7)$$

therefore the light beam LA1 irradiating from the object lens 8 is inclined by an angle $\theta 1d$ shown by the equation (8), $$\theta 1d = \frac{Ld}{Fc} \approx \frac{Tc}{Fc} \frac{Nc - 1}{Nc} \theta c \quad (8)$$

here, Fc is a focal distance of the collimator 7.

As a result, when the optical disc 2 is inclined by an angle $\theta d$, the incident light beam LA1 of the optical disc 2 incides with an inclination of an angle $(\theta d - \theta 1d)$. Then, a comatic aberration coefficient W31d of the optical disc 2 changes to the value as shown by the following equation (9).

$$W31d \approx \frac{Td}{2} \frac{Nd^2 - 1}{Nd^3} NAO^3 (\theta c - \theta 1d) \quad (9)$$

Consequently, the following equation (10) can be obtained using a relation between the equations (5), (6), (8) and (9).

$$\theta d = \frac{Tc}{Fc} \frac{Nc - 1}{Nc} - \frac{Tc(Nc^2 - 1) Nd^3 NAc^3}{Tc(Nd^2 - 1) Nc^3 NAO^3} \theta c \quad (10)$$

Accordingly it is possible to prevent any comatic aberration from occurring on the information recording surface 4 when the parallel plane or flat plate 11 is inclined relative to an inclination $\theta d$ of the optical disc 2 with a fixed magnification determined by the optical system of the disc reproducing apparatus 1.

In short, only detecting the inclination of the optical disc 2 and inclining the parallel flat plate along the direction opposite to the inclination or skew of the optical disc 2 on the basis of the detection results can prevent comatic aberrations from occurring.

It is possible to prevent comatic aberrations from occurring only by inclining the parallel flat plate 11 of the disc reproducing apparatus 1, so that it is said that any comatic aberrations can be surely and easily prevented from occurring even though the optical discs heavily change.

Consequently, even though the recording density of the optical disc becomes high, it is possible to effectively reproduce the recorded information with using the disc reproducing apparatus of a simple structure.

According to a correction principle above, the beam splitter 12 is interposed between the beam splitter 9 and the light receiving element 10 in order to branch the reflective light beam LA2.

In the disc reproducing apparatus of the present invention, the branched reflective light beam LA2 is also led to the light receiving element 14 through the light shield plate 13.

Figure 14:
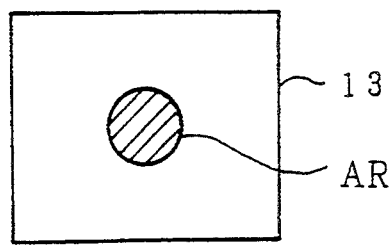
FIG. 14 is a front view of the light shield plate 13 of FIG. 12.

As shown in FIG. 14, the light shield plate 13 is adapted to be formed by forming a circular light shielding region AR in the parallel flat plate made of a transparent material and being held at a position conjugated to the information recording surface 4.

As a result, when a comatic aberration is occurred in the information recording surface 4, the disc reproducing apparatus 1 of such structure is adapted to generate the same comatic aberration as that of the information recording surface 4 on the light shield plate 13, and to change a passing light amount according to a occurred amount of the comatic aberration.

Figure 15:
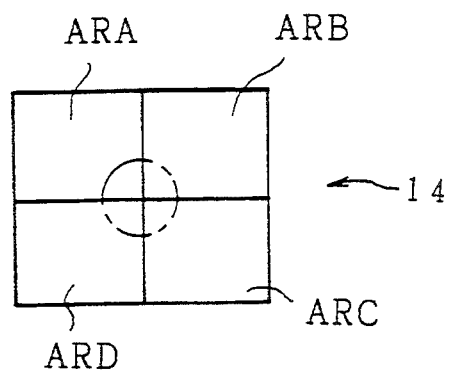
FIG. 15 is a front view of the light receiving element 14 of FIG. 12.

The light receiving element 14 is, as shown in FIG. 15, divided the light receiving surface into four parts constructing or being combined to a right square, and is so arranged that the central portion thereof faces to the light shield region AR of the shield plate 13 and the directions of the diagonal lines of the receiving surface takes respectively a radial direction (a direction crossing recording tracks) and a tangential direction (a direction running along recording tracks).

Subtraction circuits 15 and 16 subtract output signals S1A and S1B of diagonal receiving regions ARA and ARB from output signals S1C and S1D of diagonal receiving regions ARC and ARD respectively, and deliver subtracted results thereof to coils 19 and 20 via amplifier circuits 17 and 18.

The coils 19 and 20 tilt the parallel flat plate 11 toward the radial and tangential directions respectively when a predetermined drive current is supplied to the coils.

Consequently, when the parallel flat plate 11 of the disc reproducing apparatus 1 is so adjusted to tilt the parallel flat plate 11 and to prevent a comatic aberration from occurring in the light shield plate 13, any comatic aberration can effectively be avoided from occurring in the information recording surface 4.

In the disc reproducing apparatus 1 of such structure above, the light beam LA1 irradiated from the laser source is given a predetermined comatic aberration at the parallel flat plate 11, then is changed to parallel light beam through a collimator 7, passes the object lens 8 to be focused on the information recording surface 4.

As a reuslt, the reflective light beam LA2 reflected from the optical disc 2 is led to the beam splitter 9 through, in the opposite order of that of the light beam LA1, the object lens 8 and the collimator lens 7. After being separated from the light beam LA1, the reflective light beam LA2 is led to the light receiving element 10.

It is possible as a result to reproduce the information recorded on the information recording surface 4 on the basis of an output signal S1 of the light receiving element 10.

Further, the reflective light beam LA2 is led to the light shield plate 13 through the beam splitter 12, its central region is shielded so as to change an amount of passing light according to the comatic aberration, and then led to the light receiving element 14.

Output signals S1A to S1D of the light receiving element 14 are subtracted by the subtraction circuits 15 and 16 are comatic aberrations of the optical disc 2 are detected.

According to the disc reproducing apparatus 1 of the present invention, the inclination of the parallel flat plate 11 is corrected on the basis of the results of detection and the comatic aberration generated by inclination of the optical disc 2 is canceled by the comatic aberration of the parallel flat plate 11, thus it is possible to effectively avoid any occurrence of comatic aberration in the information recording surface 4.

According to the disc reproducing apparatus having such simple structure above, the parallel flat plate interposed between the collimator and laser source is inclined and the comatic aberration of the parallel flat plate cancels the comatic aberration of the optical disc, thereby it is possible to firmly correct any comatic aberration with such simple apparatus. As a result, even when recorded density of information in the optical disc is increased, it is possible to surely reproduce the recorded information without any interference between coded signals.

(2) Second Embodiment

Figure 16:
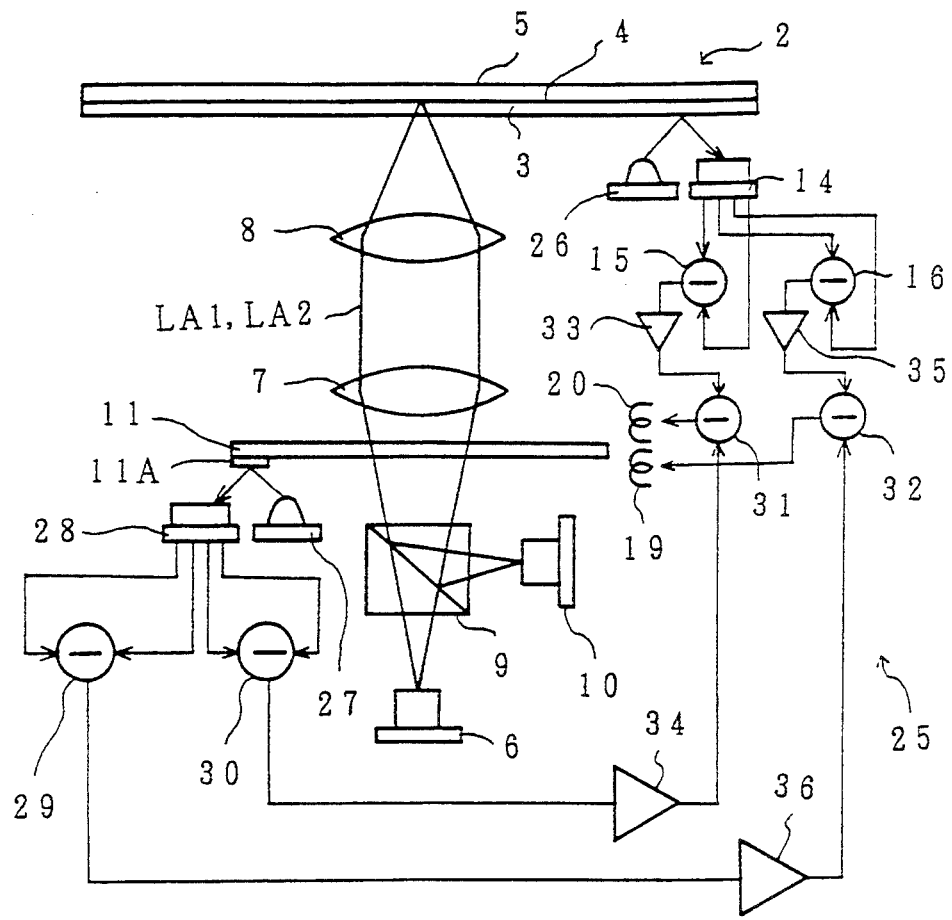
FIG. 16 is a systematic view of the second diagram of the optical disc apparatus according to the present invention.

FIG. 16 depicts the parts corresponding to that of FIG. 12 with the same numerals symbols. In the figure, 25 shows a whole structure of the disc reproducing apparatus, which directly detecting inclinations of the optical disc 2 according to the second embodiment.

The disc reproducing apparatus 25 has a photo-emitting diode 26, emitting light beam from which is reflected on the optical disc 2 and led to the light receiving element 14.

As a result, the amount of incident beam of the light receiving regions ARA to ARD is adapted to change according to the inclination of the optical disc 2 in the light receiving element 14 of the disc reproducing apparatus 25. Thus, the output signals from respective light receiving regions ARA to ARD are subtracted in the substration circuits 15 and 16 in order to output the detection result of inclination of the optical disc 2 along the radial direction and recording track direction.

An end portion of the parallel flat plate 11 has a mirror surface 11A formed thereon, and outputted light beam of the light-emitting element 27 installed so as to face the mirror surface 11A is reflected on the mirror surface 11A is led to the light receiving element 28.

It is noted that the light receiving element 28 has a composition identical With that of the light receiving element 14, and output signals of respective light receiving regions are subtracted in the subtraction circuits 29 and 30 in order to detect inclinations of the parallel flat plate 11.

These subtraction circuits 31 and 32, respectively subtract the output signals of the subtraction circuit 15, 30 and 16, 29 through amplifier circuit 33, 34 and 35, and 36 in order to detect errors of the inclinations of the optical disc 2 and the parallel flat plate 11 measured along the radial direction and tangential direction (recording track direction), respectively, driving the coils 20 and 19 on the basis of the detection results.

Using the structure of the optical disc apparatus, it is possible to prevent any comatic aberrations on the information recording surface from occurring through an inclinating of the parallel flat plate on the basis of the detection results. In other words, it is possible to obtain directly the detection results, so that happenings of comatic aberrations can be prevented previously.

(3) Another Embodiment

The first and second embodiments of the optical disc apparatus according to the present invention relate to the apparatus, respectively provided with a parallel flat plate adapted to tilt along its radial direction and tangential direction (recording track direction). It is apparent that the present invention is not limited to such compositions above of the optical disc apparatus and the parallel flat plate can tilt along anyone of the radial direction and the tangential direction. (recording track direction).

Figure 17:
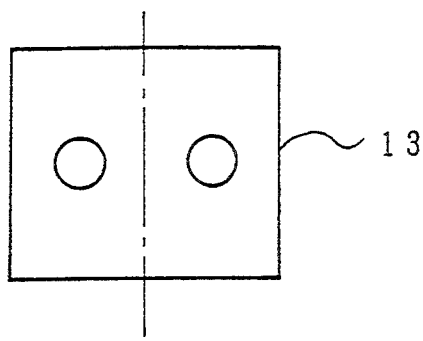
FIG. 17 is a front view of another embodiment of the light shield plate 13 using pin holes.
Figure 18:
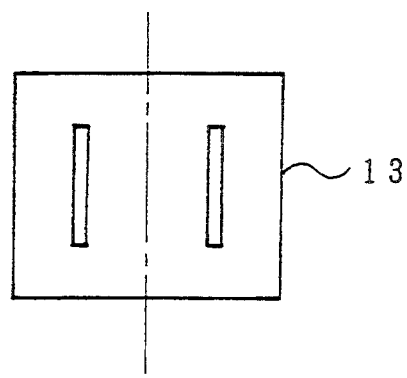
FIG. 18 is a front view of still another embodiment of the light shield plate 13 using slits.

According to another embodiment of the present invention, as shown in FIGS. 17 and 18, a light shield plate having two pin holes formed along a correction direction or two slits formed along a correction direction so as to receive the reflected light LA2 by the light receiving regions corresponding to each pin hole or slit can be used.

According to the previous first and second embodiments of the disc reproducing apparatus, the parallel flat plate is interposed between the collimator lens and the laser source. However, the present invention is not limited to the particular composition of the disc reproducing apparatus. That is, the interposing position of the parallel flat plate can be selected among various positions of interposing the plate at least in a focussed or bundled light beam LA1, for example interposing it between the object lens and the optical disc.

Further, according to the first embodiment, reflected light beam LA2 is separated from light beam LA1 at a position back of the collimator lens in order to detect a comatic aberration. However, the present invention is not limited to such structure of the disc reproducing apparatus. It is possible to separate reflected light beam LA2 from li light beam LA1 at various positions in order to detect comatic aberration.

In addition, according to the first and the second embodiments, a single parallel flat plate is tilted along a radial direction and a tangential direction. It is noted that the present invention is is not limited to such structure. It is possible to tilt two parallel flat plates along radial and recording track directions.

According to the first and second embodiments of the optical disc apparatus, reflected light beam LA2 is led to the light receiving element and light amount change reproduces the recorded information. The present invention is not limited to such composition and the present invention includes a composition provided with a photographing element photographing an image of the optical disc in order to reproduce recorded information.

In particular, a kind of conventional reproducing system for photographing enlarged images of the information recorded surface by a photographing element in order to reproduce recorded information has a problem of difficulty of reproducing even when the optical disc a little tilts or skews. It is possible to apply the present invention to the conventional system in order to solve the problem and effectively reproduce recorded information.

It is noted that the first and second embodiments of the present invention relate to a disc reproducing apparatus adapted to exclusively use in reproducing. However, the present invention is not limited to such kind of a disc reproducing apparatus and is applied widely to every optical disc apparatus for irradiating light beam on information recorded surface at a predetermined timing in order to record and reproduce desired information.

(4) Third embodiment

Figure 19:
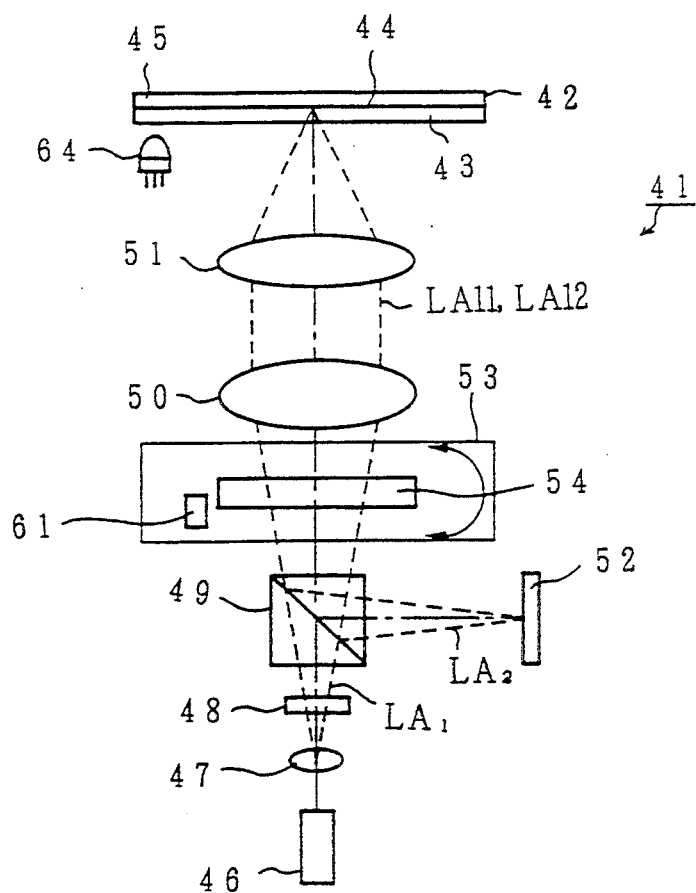
FIG. 19 is a systematic view of the third embodiment of the optical disc apparatus according to the present invention.
Figure 20:
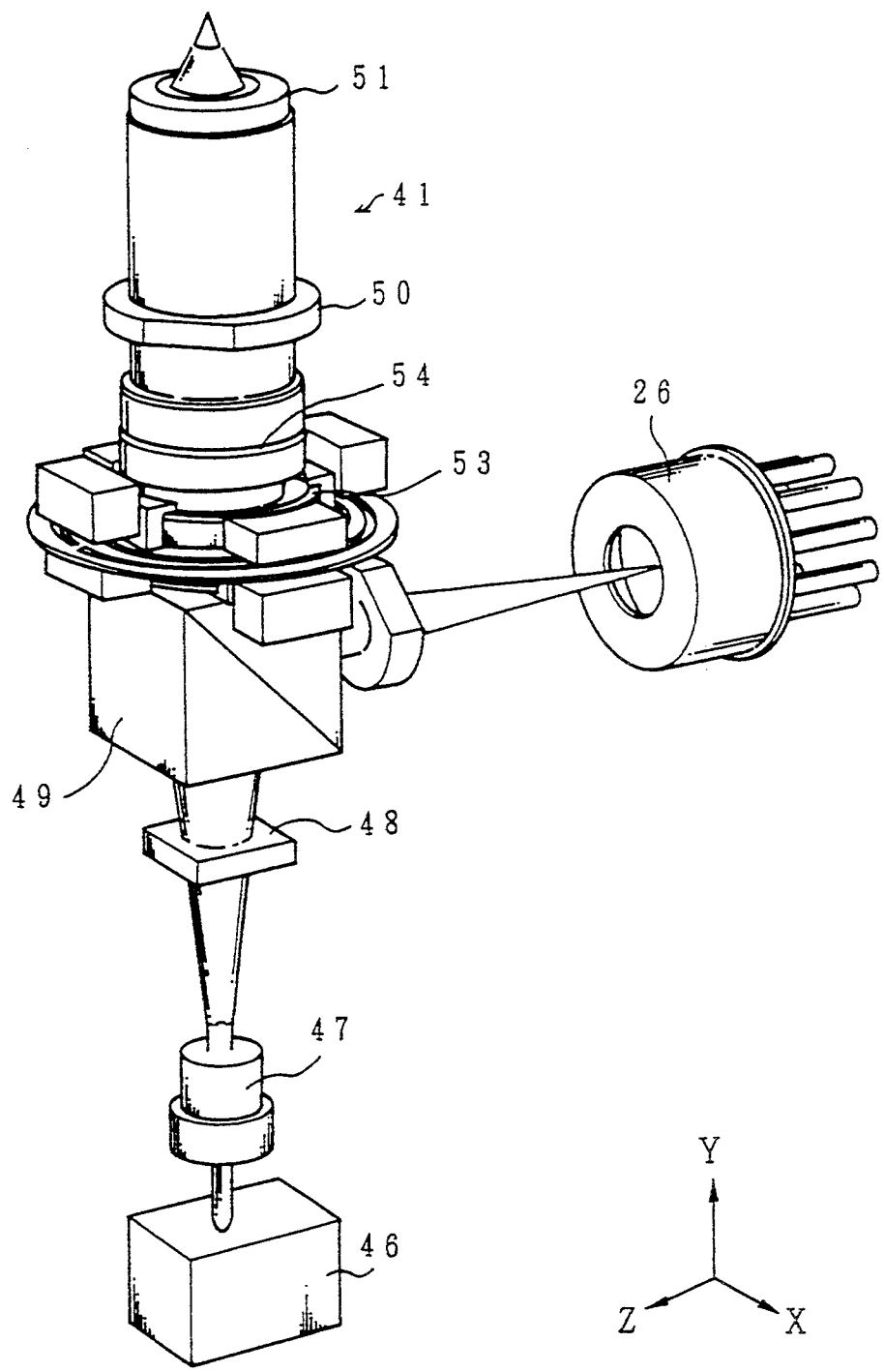
FIG. 20 is a perspective view showing an appearance of the optical disc apparatus of FIG. 19.

FIG. 19 shows a basic structure of the third embodiment of the optical disc apparatus according to the present invention. FIG. 20 depicts an appearance of the third embodiment.

The optical disc apparatus 41 of the third embodiment picks up recorded information in the optical disc 42.

The optical disc 42 has a transparent substrate or transparent surface member 43, a information recorded face 44 formed on the surface member 43, and a protective membrane 45 placed thereon.

For example, a light source 46 consisting of a semiconductor laser emits light beam LA11, the light beam LA11 is focussed and irradiates the information recorded surface 44 of the optical disc 42 through a lens system 47, grating 48, beam splitter 49, collimator 50, and object lens 51.

The reflected light (for example, diffraction light) LA12 reflected from the information recorded surface 44 of the optical disc 42 according to the recorded information is separated by the beam splitter 49 and led into a light detection portion 52 for reproducing information signals.

Adding to the components of the structure of the optical disc apparatus, a light beam spot correction means 53 is provided between the collimator lens 50 and the beam splitter 49.

This light beam spot correction means 53 is placed on a basic beam axis of a light beam advancing toward the optical disc 42. In other words, a transparent parallel flat plate 54 made of, for example, flint glass having high refractive index of the light beam correction means 53 is positioned on an Y axis direction of the optical disc apparatus 41.

The parallel flat plate 53 can swivel in the first and second axes X and Z crossing perpendicular or orthogonarily or radial direction and tangential direction (recording track direction) of the optical disc, or can oscillate, and adapted to be controlled according to inclination of the optical disc 42 along its radial direction and tangential direction.

Figure 21:
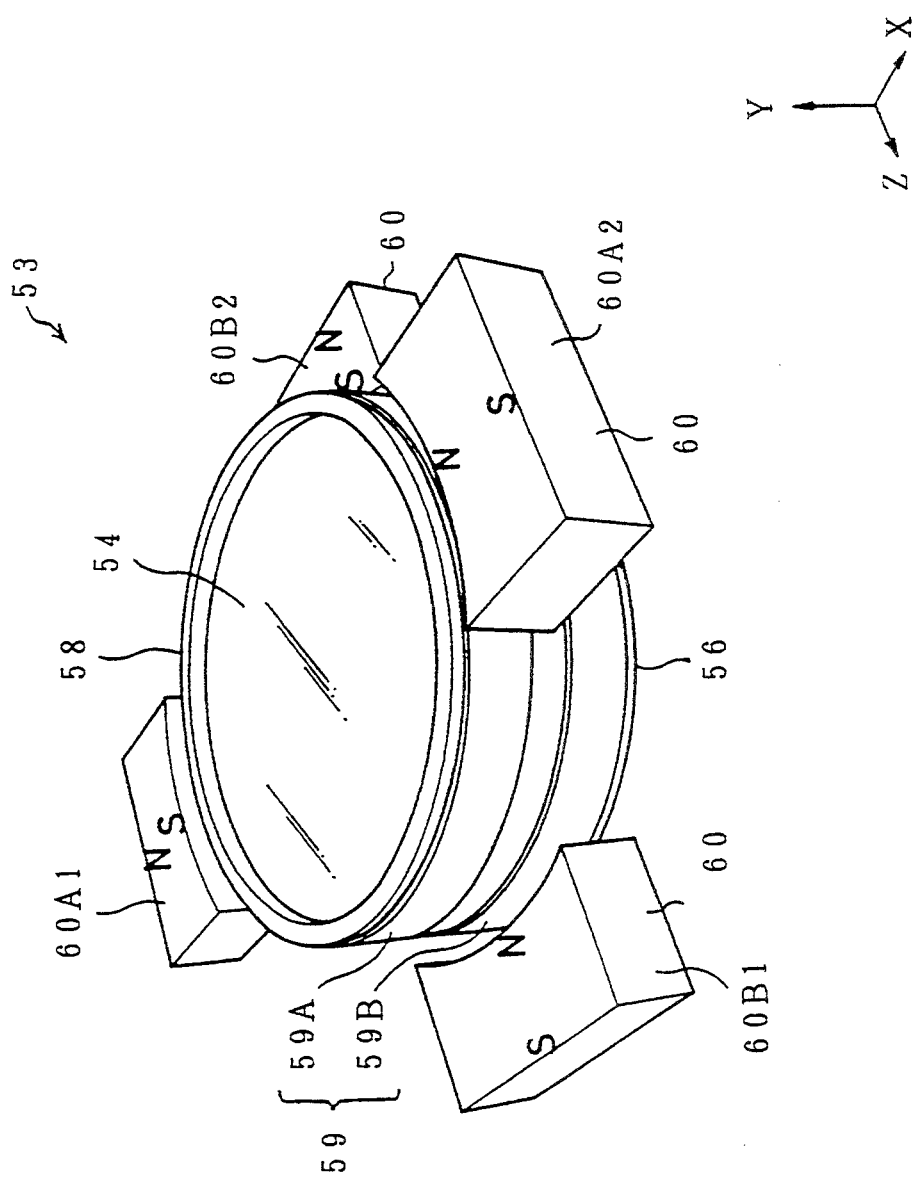
FIG. 21 is a perspective view depicting an important part of the optical beam spot correction means.
Figure 22:
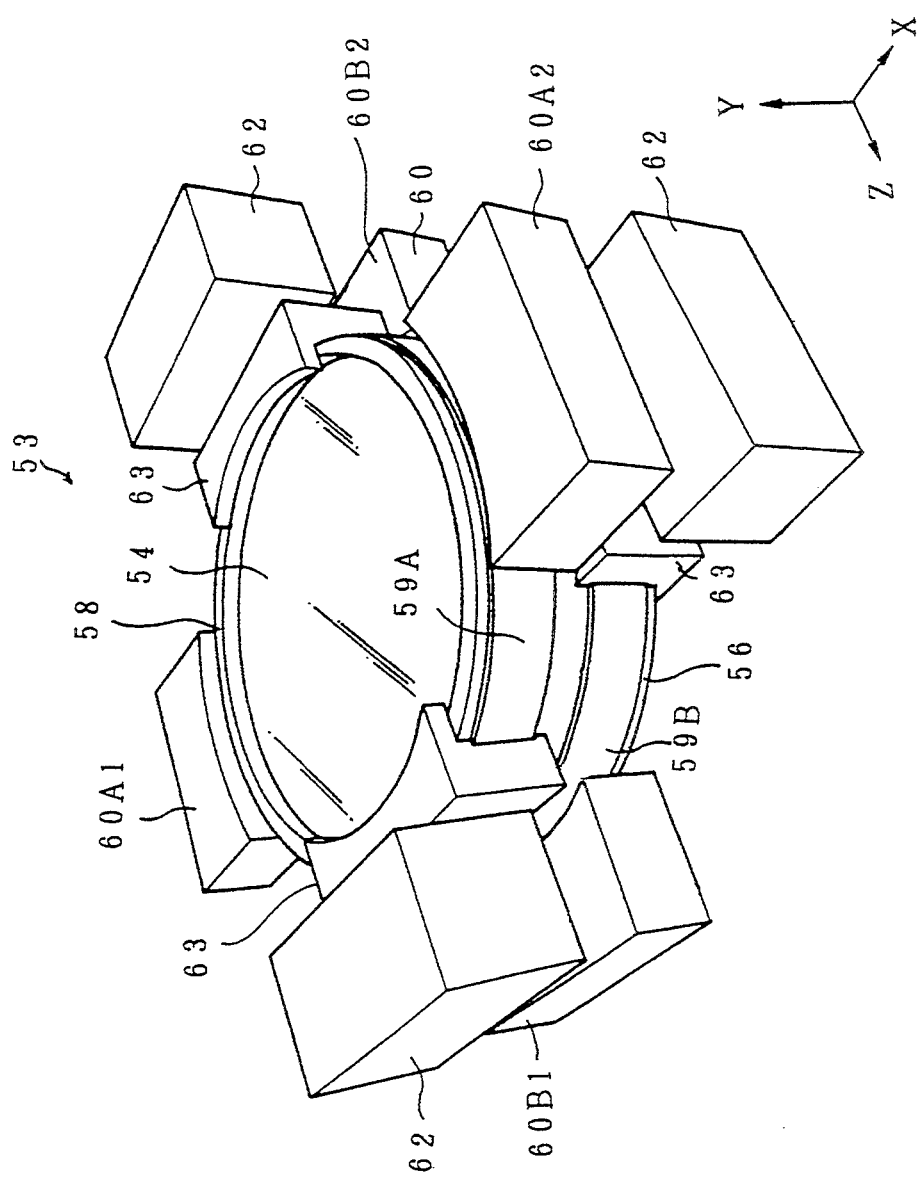
FIG. 22 is a perspective view depicting an important part of the optical beam spot correction means including a structure of FIG. 21.
Figure 23:
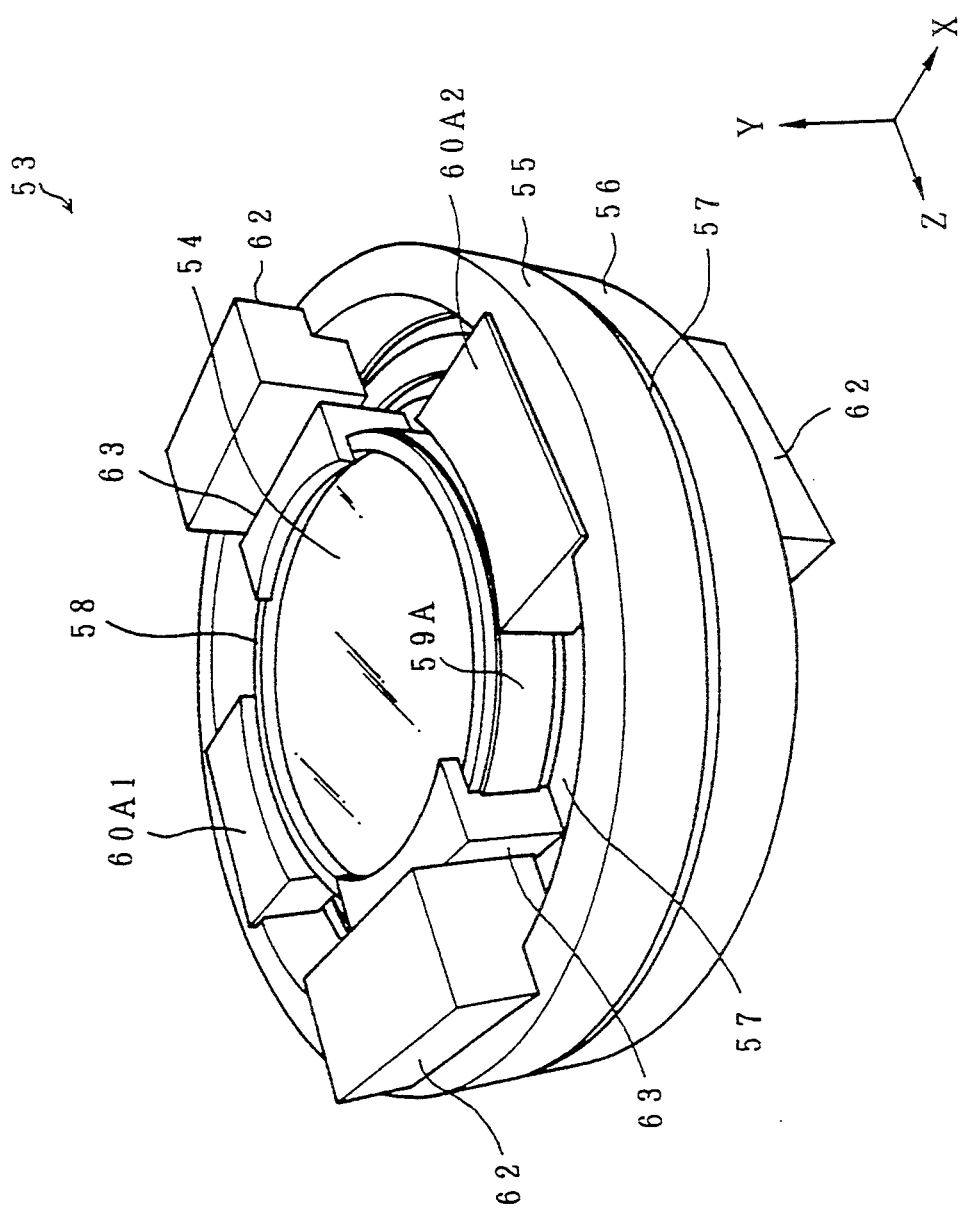
FIG. 23 is a perspective view depicting an important part of the optical beam spot correction means including a structure of FIG. 22.

As shown in FIG. 21 to FIG. 23, the transparent parallel flat plate 54 is oscillatably supported by a leaf spring 57 of a disc-like having a circumferential portion sandwiched between a pair of ring-like bases 55 and 56 made of iron, for example, ferromagnetic material.

Figure 24:
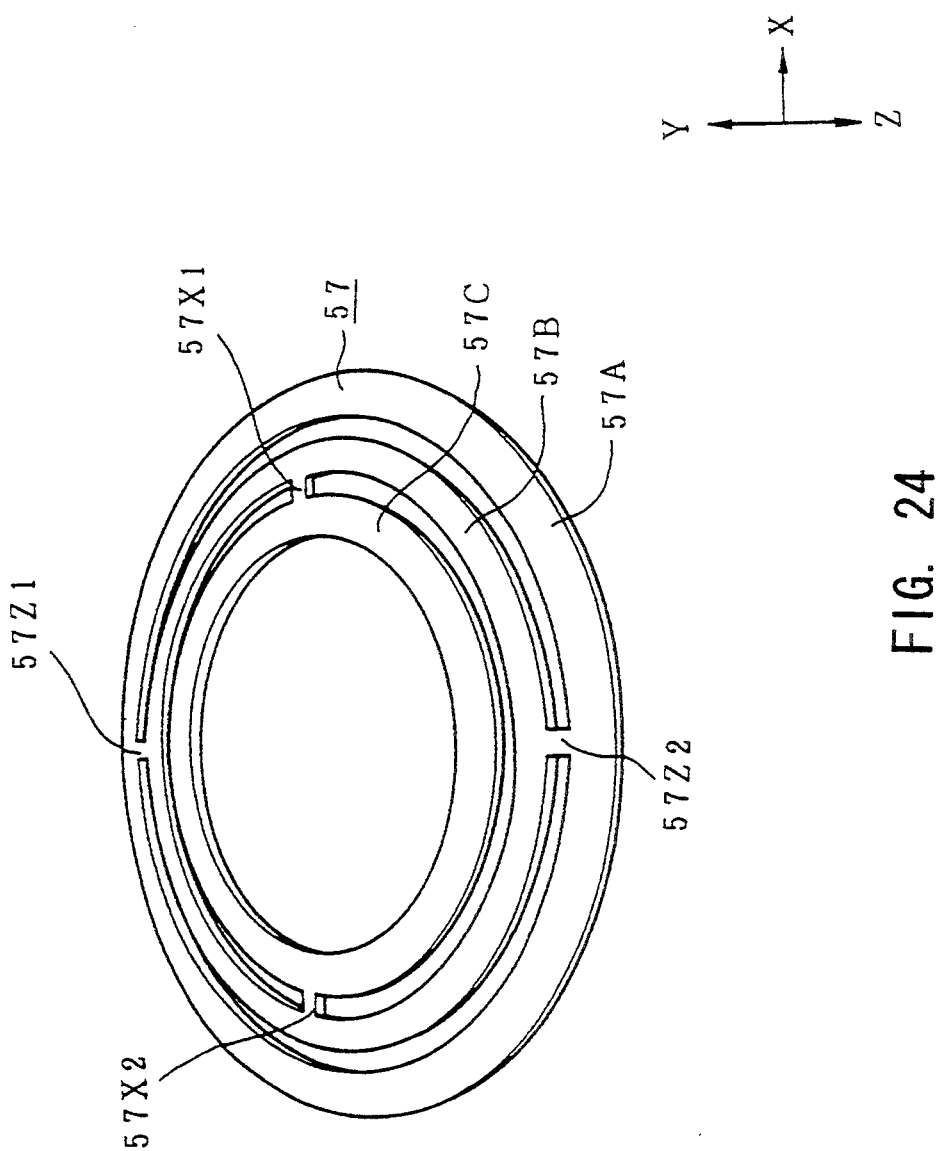
FIG. 24 is a perspective view of the leaf spring of the optical beam spot correction means.

As shown in FIG. 24 depicting a perspective view of an example of the leaf spring 57, it is made by punching a ring-like resilient metal plate having circumferential ring portion 57A, intermediate ring portion 57B, and central ring portion 57C. For example, the circumferential ring portion 57A and the intermediate ring portion 57B are integrally connected by connection portions 57Z1 and 57Z2 along Z axis, and further the intermediate ring portion 57B and the central ring portion 57C are integrally connected through connection portions 57X1 and 57X2 on X axis resulting in revolving of the intermediate ring portion 57B relative to the circumferential ring portion 57A on X axis and Z axis, or oscillating of the central ring portion 57C relative to the circumferential ring portion 57C.

Figure 25:
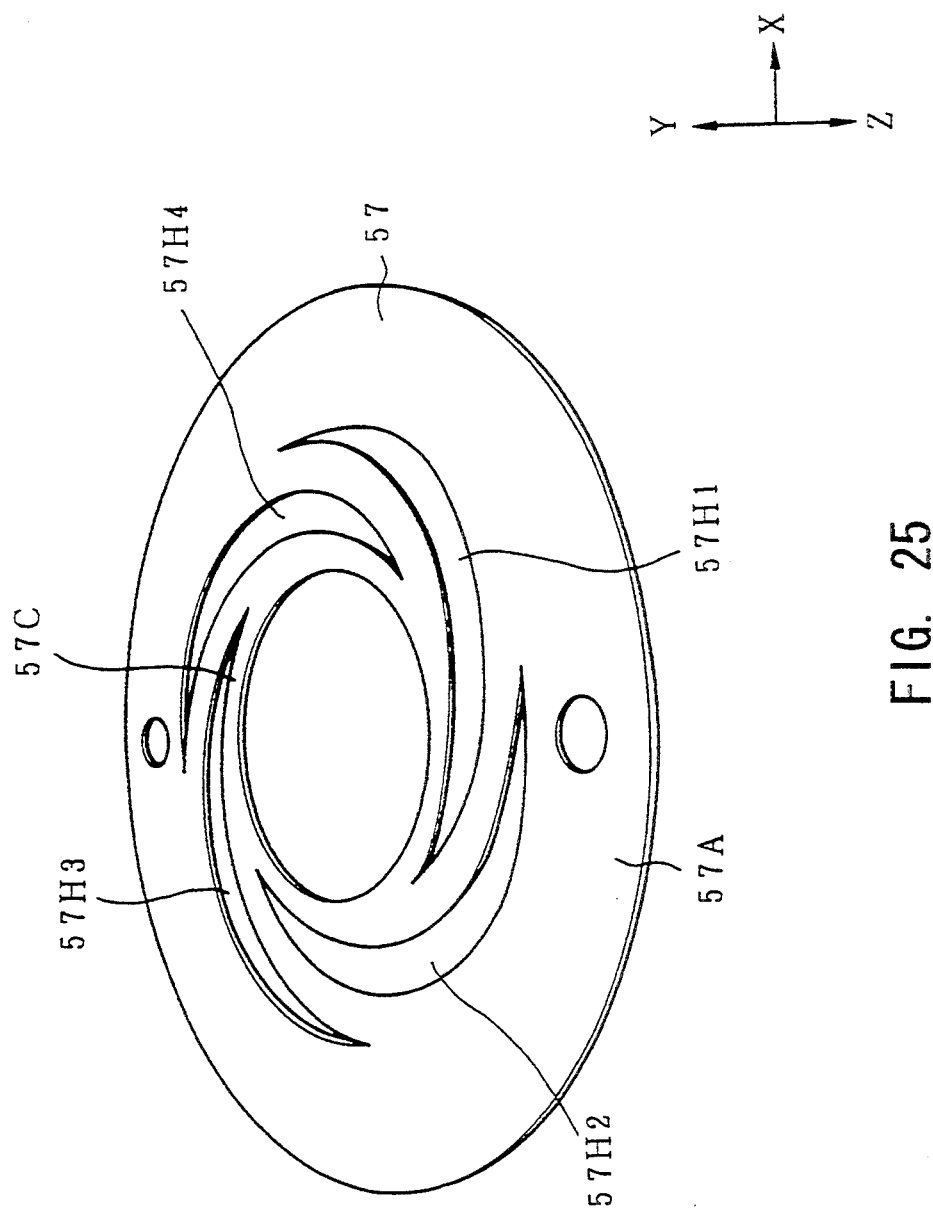
FIG. 25 is a perspective view of another embodiment of the leaf spring of optical beam spot correction means.

It is also possible to make the leaf spring 57 by, for example, a punching a disc-like resilient metal plate as shown in FIG. 25. The leaf spring 57 has a pattern of four through openings 57H1, 57H2, 57H3 and 57H4 of a shape of crescent moon, each through openings are arranged in a swirl shape at a regular interval from a periphery of the leaf spring 57 to the center thereof. Thus, the central ring portion 57C can oscillate relative to the circumferential ring portion 57A.

Figure 26:
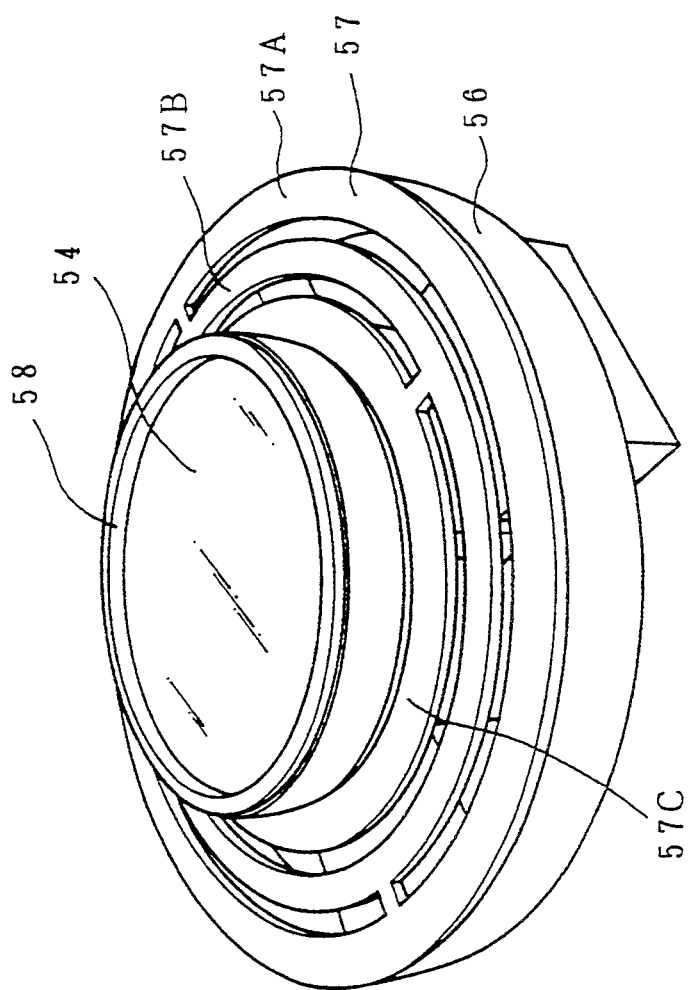
FIG. 26 is a perspective depicting an arrangement of the leaf spring in the optical beam spot correction means.

In addition, a mirror barrel or bobbin 58 having a transparent parallel flat plate 54 placed and secured coaxially in its interior is inserted in and secured to the axis of the central ring portion 57C of the leaf spring 57 as shown in FIG. 26.

The bobbin 58 has a coil 59 around an periphery of circumference of the bobbin 58, which coil consisting of a pair of coil parts 59A and 59B.

While, pairs of magnets 60A1 and 60A2, 60B1 and 60B2 are placed on X axis and Y axis so as to close and face to the outer peripheries of respective coils 59A and 59B of the bases 55 and 56, or so as to face to each other relative to the radial direction and tangential direction. In this composition of the leaf spring, ferromagnetic material bases 55 and 56 function as yokes of the magnets.

These pairs of magnets 60A1 and 60A2, 60B1 and 60B2 facing to each other sandwiching respective coils 59A and 59B are magnetized so as to make their magnetic poles opposed to each other by selecting the particular poles along a direction perpendicular to the basic optical axis.

According to the structure, suitably selecting a current direction to the coils 59A and 59B changes the inclination of the transparent parallel flat plate 54 in the magnetic field made by the magnets 60A1 and 60A2, 60B1 and 60B2. The inclination above means that around X axis and Z axis along radial direction and tangential direction.

The optical beam spot correction means 53 has a photo-reflector 62 of a sensor 61 for detecting an inclination of the correction means 53 or an inclination angle θc of the transparent parallel flat plate 54. The photo-reflector 62 has photo-detectors (not shown) of light emitting elements, for example, a semiconductor light emitting diodes LED or PIN diodes.

Two pairs of photo-reflectors 62 are positioned on a securing portion such as the bases 55 and 56 so as to oppose to each other on X axis and Z axis sandwiching a movable bobbin 58. Reflecting mirrors 63 are provided on the bobbin 58 so as to face to each other.

A disc skew sensor 64 is placed close to the optical disc 42 as shown in FIG. 19.

According to the optical pick-up device 41 provided with the optical beam spot correction means 53, it is possible to improve strain of reproduced signals in accordance with a correction of optical beam spot on the basis of inclinations of radial direction and tangential direction of the optical disc 42.

That if, as described above, a comatic aberration coefficient W31d generated when the optical disc 42 tilts is expressed by the following equation (11).

$$W31d = \frac{Td}{2} \frac{(Nd^2 - 1) Nd^2 \sin\theta d \cos\theta d}{(Nd^2 - \sin^2\theta d)^{5/2}} NAO^3 \qquad (11)$$
$$= \frac{Td}{2} \frac{Nd^2 - 1}{Nd^3} NAO^3 \theta d$$

It is understood from the above that a size of comatic aberrations changes linearly following an inclination of the optical disc 42 when the inclination is very small.

When the transparent parallel flat plate 54 is interposed in bundled light beam, also comatic aberration is generated. The comatic aberration is expressed by the following equation (12), $$W31c = \frac{Tc}{2} \frac{Nc^2 - 1}{Nc^3} NAc^3 \theta d \qquad (12)$$

wherein Nc means a refractive index of the parallel flat plate 54, Tc is a thickness of the plate 54, θc is an inclination of the plate 54, and NAc is an aperture number of the collimator lens 50.

Accordingly, when the parallel flat plate 54 tilts in order to control an amount of comatic aberration so as to come to the following equation of $$W31c = -W31d \qquad (13)$$

it is possible to cancel the comatic aberration generated in the optical disc 42 and to always keep the spot shape on the information recording surface 44 a circle.

Figure 27:
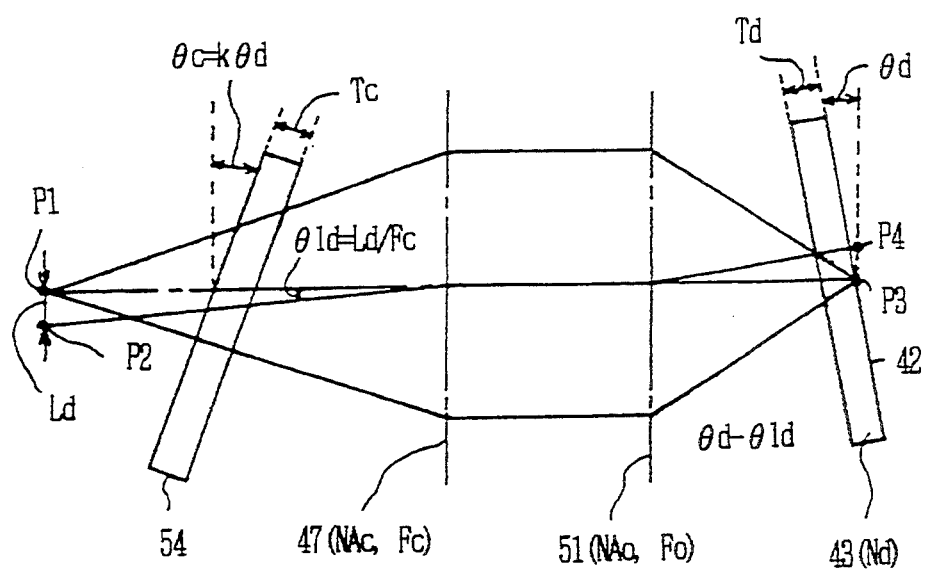
FIG. 27 is an outline of a correction operation of the transparent parallel flat plate.

When the transparent parallel flat plate 54 is tilted as shown in FIG. 27, the light path of light beam a head to the optical disc 42 changes as if the irradiating point of the light beam is moved from a point P1 to a point P2. At the side of the optical disc 42, the focussing point of the light beam is moved from a point P3 to a point P4.

It is understood that even though the optical disc 42 tilts, tilting the transparent parallel flat plate 54 can cancel any comatic aberrations.

Then, a moved distance Ld of the irradiating point is expressed by the following equation (14), $$Ld = Tc\sin\theta c \left[ 1 - \sqrt{\left( \frac{1 - \sin^2\theta c}{Nc^2 - \sin^2\theta c} \right)} \right] \approx Tc \frac{Nc - 1}{Nc} \theta c \qquad (14)$$

thereby, the light beam LA1 irradiated from the object lens 51 tilts by an angle θ1d which can be obtained by the following equation (15), $$\theta 1d = \frac{Ld}{Fc} = \frac{Tc}{Fc} \frac{Nc - 1}{Nc} \theta c \qquad (15)$$

wherein, Fc is a focussing distance of the collimator lens 22.

Consequently, when the optical disc 42 tilts by an angle θd, beam from the optical disc 42 is entered with an inclination (θd−θ1d) and a comatic aberration coefficient W31d of the optical disc 42 is expressed by the following equation (16).

$$W31d = \frac{Td}{2} \frac{Nd^2 - 1}{Nd^3} NAO^3(\theta c - \theta 1d) \qquad (16)$$

Consequently, the following equation (17) can be obtained by calculating these equations (12), (13), (15) and (16).

$$\theta d = \left\{ \frac{Tc(Nc^2 - 1) Nd^3 NAc^3}{Td(Nd^2 - 1) Nc^3 NAo^3} \right\} \theta c \qquad (17)$$

It has been known that, when the optical disc 42 tilts by an angle θd, the parallel flat plate 54 is inclines with a predetermined magnification fixed by the optical system of the optical disc apparatus 41 in order to completely prevent comatic aberration on the information recording surface 44.

That is, it is possible to prevent any comatic aberration from occurrencing on the information recording surface 44 by only detecting inclination of the optical disc 42 and tilting the parallel flat plate 54 according to the detection result in a direction opposed to the inclination of the optical disc 42.

Figure 28:
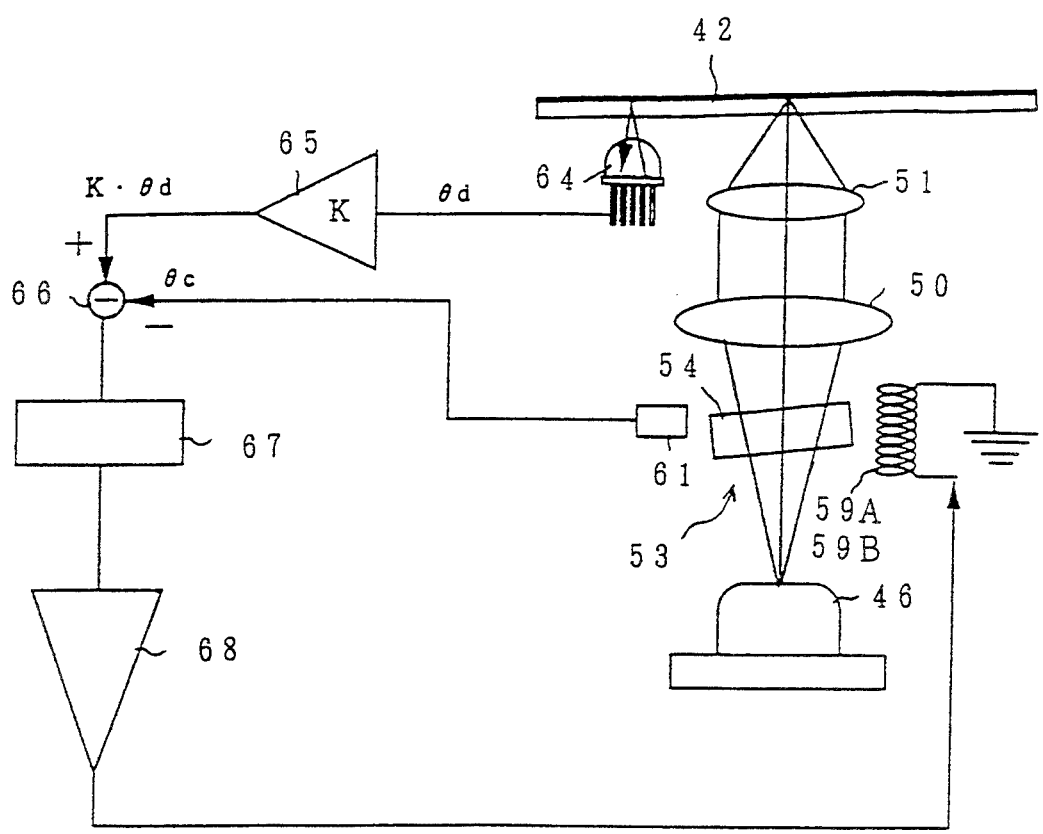
FIG. 28 is a systematic view showing a servo block in the third embodiment.

A servo circuit used to attain such function above will be explained with reference to a block diagram of FIG. 28. The parts and members shown in FIG. 28 and corresponding to the parts and members shown in FIG. 19 have the same reference numerals or symbols and explanation for them are omitted from the following description of the specification.

A skew sensor 64 of the optical disc detects a skew amount θd of the optical disc 42, the skew amount is entered into the processing circuit 65 in order to obtain an equation K·θd of a coefficient K expressed by the following equation (18).

$$K = \frac{td}{tc} \frac{nd^2 - 1}{nc^2 - 1} \frac{nc^2}{nd^2} \frac{NAd^3}{NAc^3} \qquad (18)$$

The output K·θd and a skew angle θc detected by a skew angle detecting sensor 61 of the transparent parallel flat plate 54 are subtracted by a subtracter 66, the resultant is supplemented in phase and amplified in an amplifier 68. It is impressed to coils 59A and 59B of the correction means 53 of optical beam spot in order to control skew of the transparent parallel flat plate 54.

That is, when the equation K·θd=θc is obtained, or the equation (14) is satisfied, or the equation (13) is established and comatic aberration of optical beam spot on the optical disc 42 is counterbalanced with comatic aberration owing to the parallel flat plate 54 becoming it zero in appearance, so that an output of the subtracter 66 becomes zero. Consequently, current head to these coils 59A and 59B is made cut off and the transparent parallel flat plate 54 is fixed to the skew position.

θd and θc are detected along the radial direction and the tangential direction, respectively, and a current flows through the coils 59A and 59B in order to control the skews along both the directions.

In other words, when a current flows through the coils 59A and/or 59B, forces opposed to each other are functioned around a Z axis of the coils owing to magnetic fields of respective pairs of the magnets 60A1 and 60A2, and around a X axis of the coils owing to magnetic fields of respective pairs of the magnets 60B1 and 60B2, thus the transparent parallel flat plate 54 rotates along a skew angles θc and −θc, respectively determined by the current direction and the inclinations of skews along the radial direction and the tangential direction are controlled.

Figures 29A, 29B, 29C:
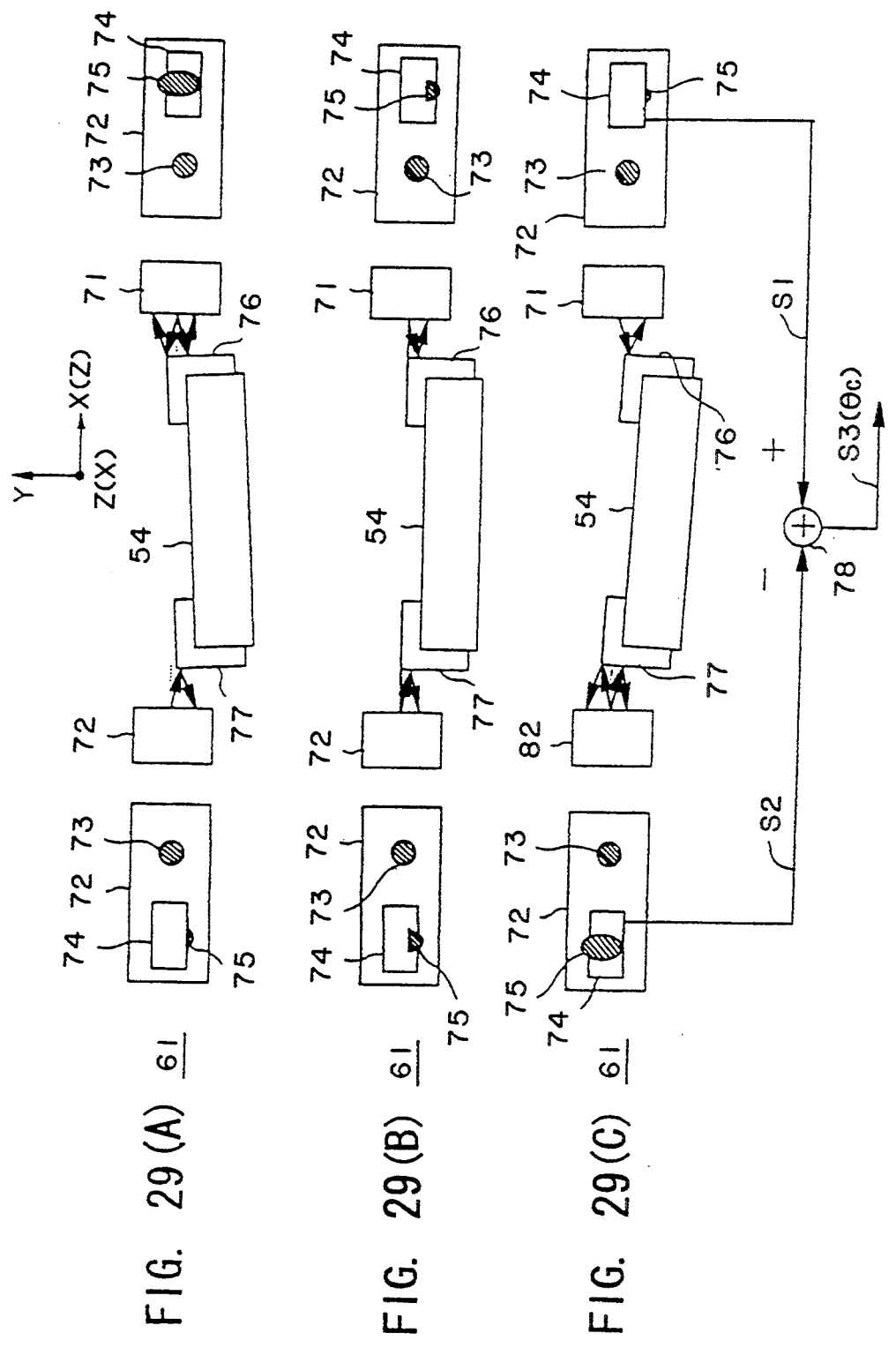

FIG. 29(A) to FIG. 29(C) show detection processes of an inclination angle θc of the transparent parallel flat plate 54 by means of photo-reflectors. This figure depicts a pair of the photo-reflectors 71 and 72, respectively arranged X axis Z axis.

FIG. 29(B) shows the transparent parallel flat plate 54 positioned on the standard axis, and FIGS. 29(A) and 29(C) depict the plate 54 rotated by a skew angle θc reversely relative to Z axis or X axis perpendicularly crossing the paper face. At the left and right end portions of FIGS. 29(A) and 29(C), the photo reflectors 71 and 72 are shown by their front views. In the front views, 73 and 74, respectively show a light emitting element LED and a photo-detector and, 75 depicts a reflective light spot of emitting light beam from LED after it returns from the reflect surfaces 76 and 77 adapted to tilt together with the transparent parallel flat plate 54.

Figure 30:
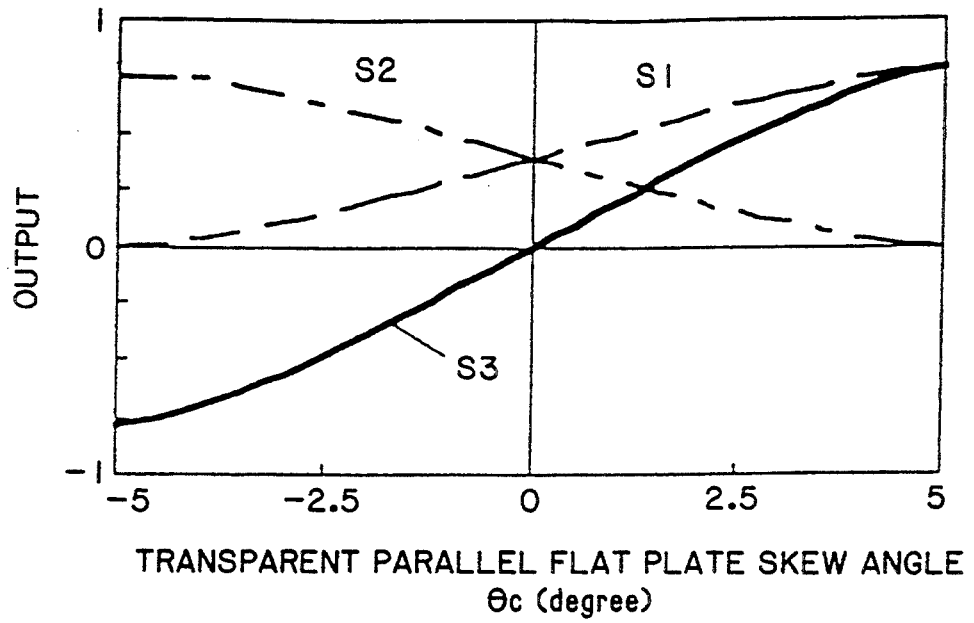
FIG. 30 is a characteristic curve diagram depicting characteristics of the inclination detection sensor of the transparent parallel flat plate.

According to the structure of the optical disc apparatus, when it is at its standard condition shown in FIG. 29(B) and the reflect spot 75 enters into the detector 74 equally left and right, the detection outputs S1 and S2 from both the reflectors 71 and 72 are made equal to each other. Then, when the transparent parallel flat plate 54 tilts at any side as shown in FIGS. 29(A) or 29(C), any area of incident beam of reflected light spot 75 incident to the photo-detectors 71 and 72 becomes large relative to the other area resulting in S1>S2 and S1<S2. These detected outputs S1 and S2 are subtracted in the subtracter 76 and a subtraction output S3 is outputted as a checking output of the skew angle detection sensor 1. The subtraction or detection output S3 shown in FIG. 30 by solid lines becomes zero expressing a skew angle θc=0 when respective S1 and S3 shown by broken lines become zero and the apparent parallel flat plate 54 is on the standard axis. On the contrary, when the skew angle θc of the transparent parallel flat plate 54 changes, the detection output S3 changes within a range of ±1.

As described above, it is possible to obtain the detection output S3 expressing a skew angle θc of the transparent parallel flat plate 54 from the skew or inclination detection sensor 61.

Figure 31:
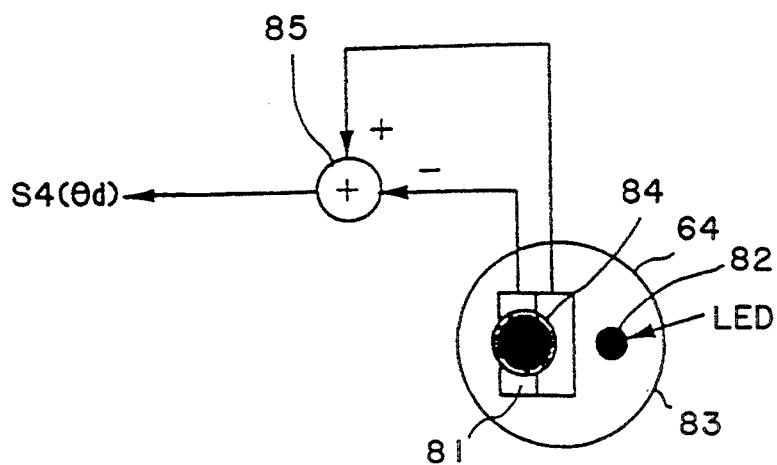
FIG. 31 is a systematic view of the structure of a skew sensor.
Figure 32:
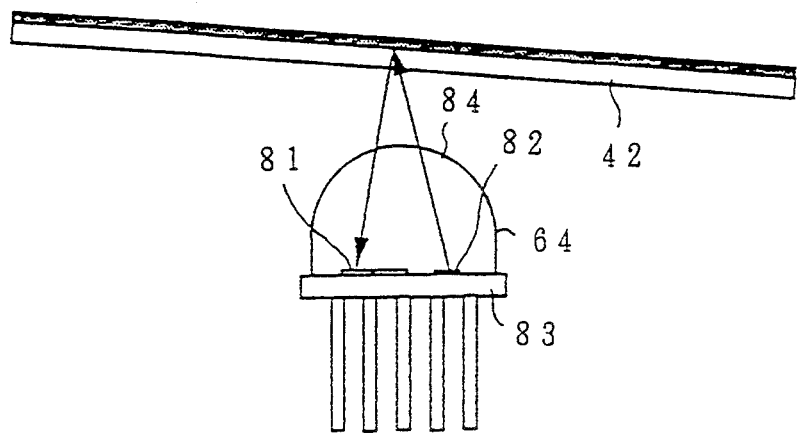
FIG. 32 is a side elevation of the skew sensor of FIG. 31.

Also, a skew sensor 64 of the optical disc 42, which having the structure shown, for example, in FIG. 31 and FIG. 32 can be used in the optical disc apparatus of the present invention. In this case, the skew sensor 64 has a photo-detector 81 made by, for example, a PIN diode and divided into two parts along the radial direction and tangential direction, and a light emitting element 82 made of a light emitting diode (LED). These photo-detector 81 and the LED 82 are placed on the common substrate 83 and the common substrate 83 is installed, for example, within a resin mold body 84 having a lens function. The light emitting element 82 emits light to the optical disc 42 and a light beam reflected from the optical disc is received by the photo-detector 81.

When the photo-detector 42 is placed at the standard position, a reflected light spot 84 is placed just at a center of the two-divided photo-detector 81. When it moves to one of the ends of the photo-detector 81 and placed in one part of the two parts, the transparent parallel flat plate 54 is said skewing at any side. Respective outputs according to the amount of light received from the both dividends are calculated by the subtracter or differential processing circuit 85. Thus, a detection signal or a skew error signal S4 expressing a skew angle θd along the radial direction or tangential direction is picked-up.

Figure 33:
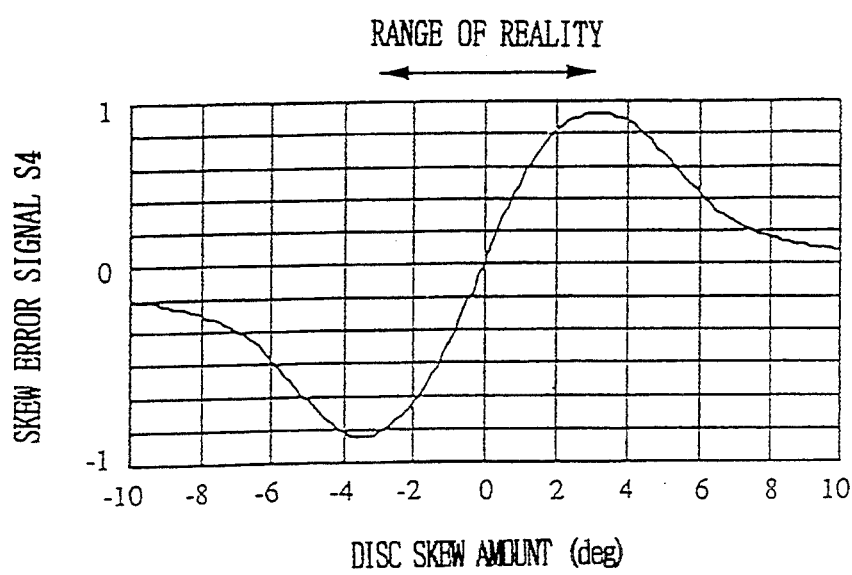
FIG. 33 is a characteristic curve diagram showing disc skew value dependency of skew error signals.

According to the skew sensor 64 shown in FIG. 31 and FIG. 32, it is possible to obtain a skew error signal S4 expressing a skew amount θd of the optical disc 42 along its radial or tangential direction as shown in FIG. 33.

According to the embodiment shown in FIG. 31, the skew sensor 64, respectively having the two-divided photo-detector 81 are placed as to the tangential direction and radial direction of the photo disc 42 in order to respectively detect a tangential skew angle and a radial skew angle.

The photo-detector 81 is not limited to this kind and it is possible to use a four-divided photo-detector divided along a radial direction and a tangential direction. In the last case, respective outputs of pairs of divided portions along respective directions are processed or calculated by a pair of differential processing circuits, so that it is possible to both skew angles along tangential direction and radial direction by means of one sensor.

(5) Fourth embodiment

According to the third embodiment above, using inclination of both the optical disc 42 or skew of the transparent parallel flat plate 54 of the light beam spot correction means 53 along both the radial direction and the tangential direction mechanically and optically corrects the shape of spots. However, it is possible to correct, for example, the radial skew or comatic aberration by means of an inclination of the transparent parallel flat plate 54. Concerning the tangential skew, it is possible also to correct the reproducing wave shape strain occurred by the skews through an electric signal processing.

According to such structure, at least one of the coils, one pair of magnets, and one pair of photo-reflectors respectively installed in the light beam spot correction means 53 can be omitted, accordingly the transparent parallel flat plate 54 can be made of a structure enabling to rotate around a single axis resulting in a simple, compact and light-weighted mechanical composition of the optical disc apparatus of the present invention.

Figure 34:
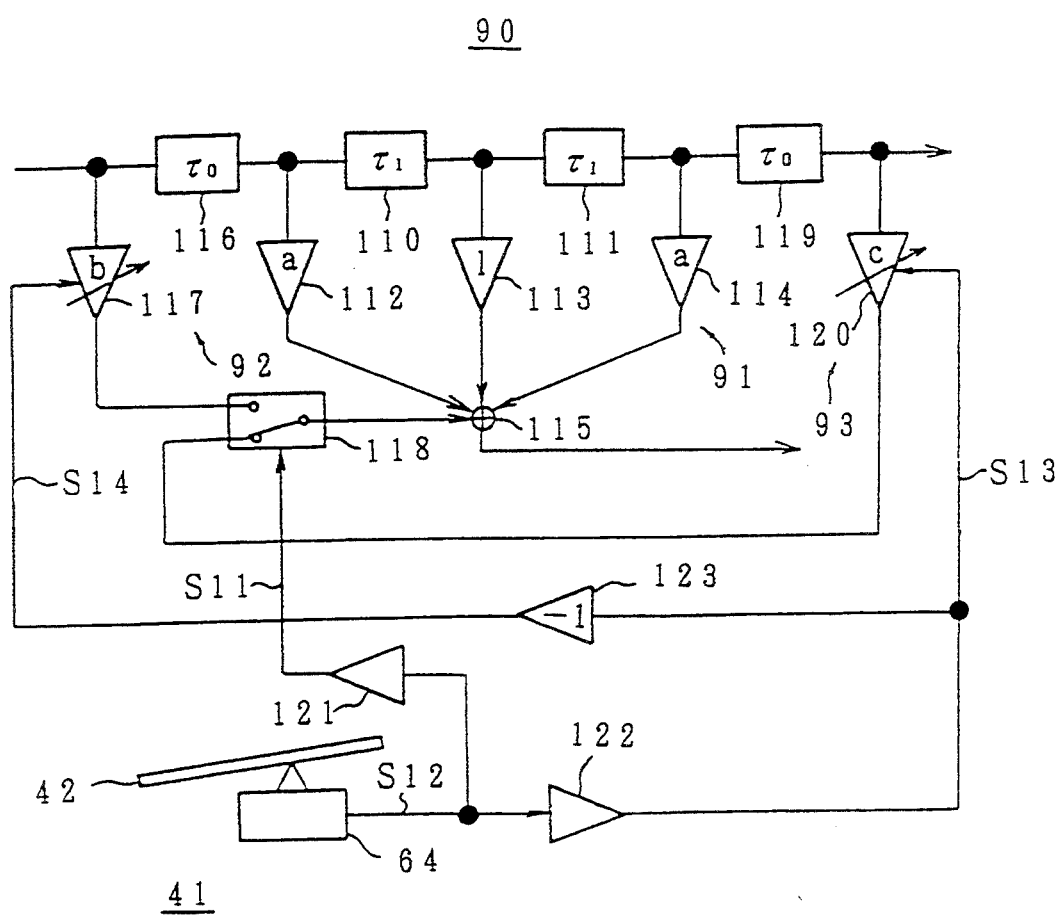
FIG. 34 is a block diagram showing the fourth embodiment of the optical disc apparatus according to the present invention.

In order to attain such functions of the optical disc apparatus, it is possible to use a filtering means 90 shown in FIG. 34, parts of which have the reference numerals corresponding to that of FIG. 31 to FIG. 33 to treat a skew along one direction, for example, of the tangential skew. In this case, concerning another directional skew of the radial skew, it is processed by the structure of the third embodiment, so that an explanation of the structure is omitted from the following description.

According to the fourth embodiment, as described with reference to FIG. 31 to FIG. 33, light beam reflected from the optical disc 42 is changed to an electrical signal through a system of two-divided photo-detector and a skew level or amount of the optical disc 42 is detected. Then, the electric signal obtained is filtering or wave shaped on the basis of a filtering coefficient determined by an amount of inclination of the optical disc 42 through a filtering means 90 and the data recorded in the optical disc 42 is reproduced from the resultant output filtered.

The filtering means 90 is constructed by a multi-step transversal filter. The filtering means 90 includes a first processing circuit portion of a transversal filter 91 having a fixed weighing coefficient of filtering coefficient weighing a disc skew amount, and a second processing circuit portion having transversal filters 92 and 93 provided with a filter coefficient changeable correspondingly to the disc skew amount.

A delay amount $\tau_2$ of a delay circuit of the transversal filter is obtained by the following equation (19).

$$1.22 \frac{\lambda}{2NA} \leq \tau_2 \leq 2.23 \frac{\lambda}{2NA} \quad (19)$$

In addition, a delay amount $\tau_2$ of the delay circuit of the transversal filter is obtained by the following equation (20), $$1.22 \frac{\lambda}{2NA \cdot \nu} \leq \tau_2 \leq 2.23 \frac{\lambda}{2NA \cdot \nu} \quad (20)$$

here, $\lambda$ is wave length of the light source, NA is an aperture number of object lens, and $v$ is a linear velocity of the optical disc.

The filter coefficient of the processing circuit provided with a changeable filter coefficient is proportional to inclination value of the optical disc.

The transversal filter includes a processing circuit having a plurality of non-changeable filter coefficients of different filter coefficients and a selection means for selecting the plurality of non-changeable filter coefficients according to inclination amount of the optical disc 42.

In the optical disc apparatus shown in FIG. 34, a cut-off frequency fc of MTF of light pick-up is determined primarily by the following equation (21) according to the wave length $\lambda$ and the aperture number of object lens, $$fc = \frac{2NA}{\lambda} \qquad (21)$$

here, for example, in case that $\lambda=0.532$ ($\mu$m), NA$=0.6$, fc becomes equal to 2255.6/mm.

Figure 8:
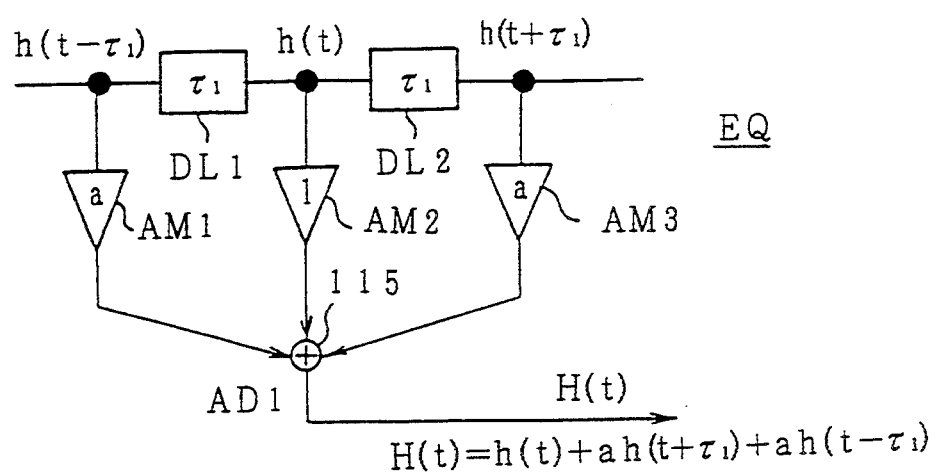
FIG. 8 is a block diagram of the three-tap type equalizer.
Figure 9A:
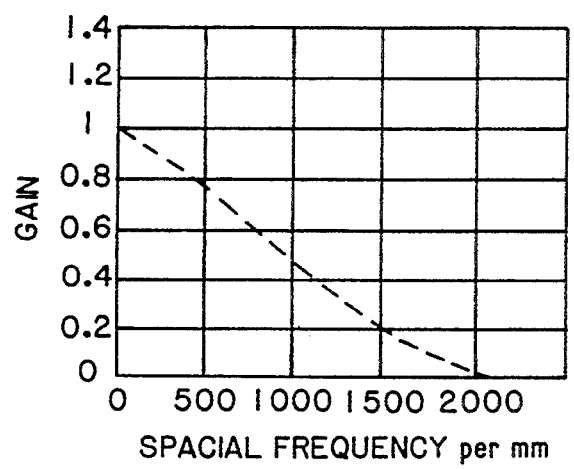
FIGS. 9(A) to 9(C) are characteristic curve diagrams explaining the characteristics of three-tap type equalizer.
Figure 9B:
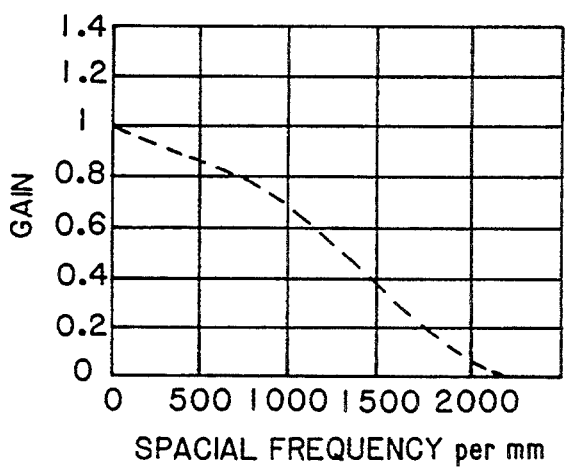
Figure 9C:
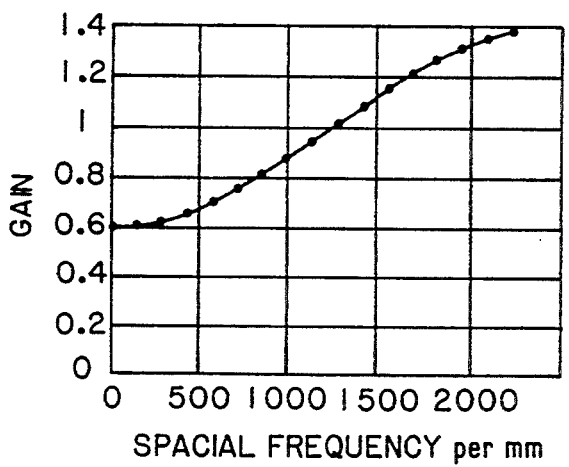
Figure 10C:
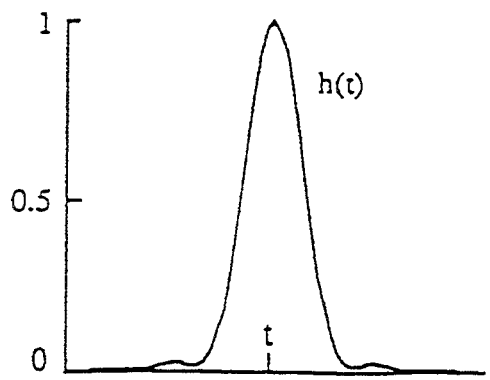
FIGS. 10(A1) to 10(C) are characteristic curve diagrams explaining the three-tap type equalizer.
Figure 10C:
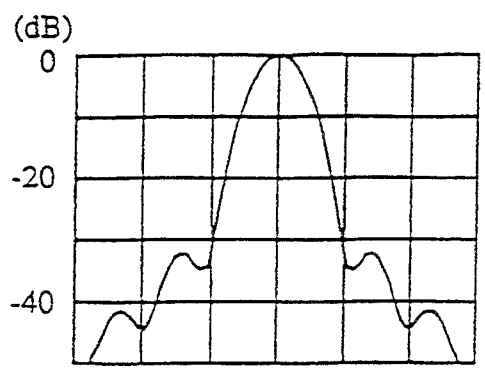
Figure 10C:
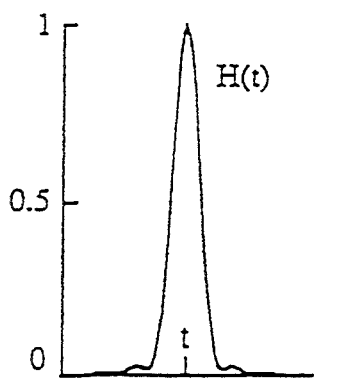
Figure 10C:
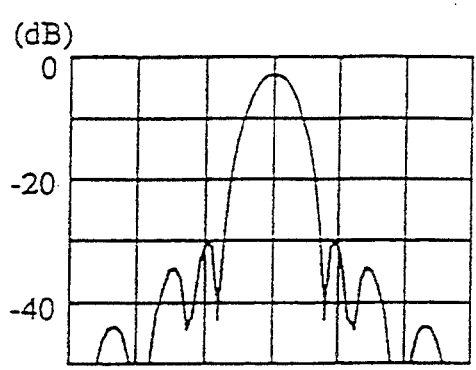
Figure 10C:
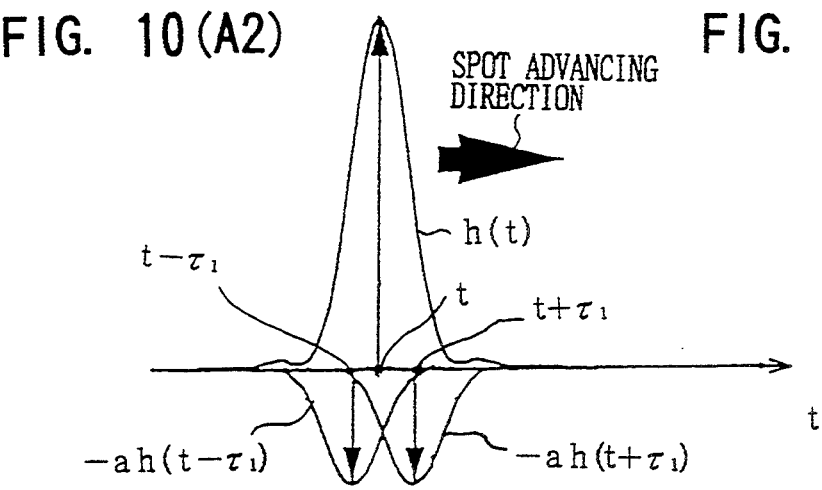
Figure 11:
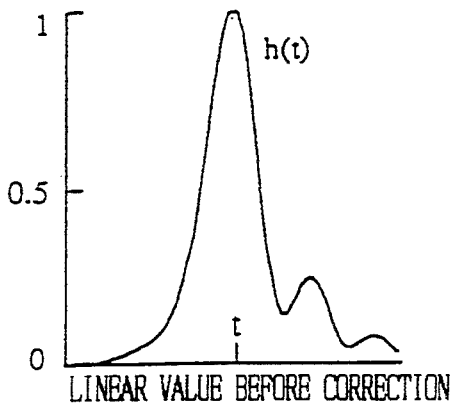
FIGS. 11(A1) to 11(C) are characteristic curve diagrams explaining the three-tap type equalizer.
Figure 11:
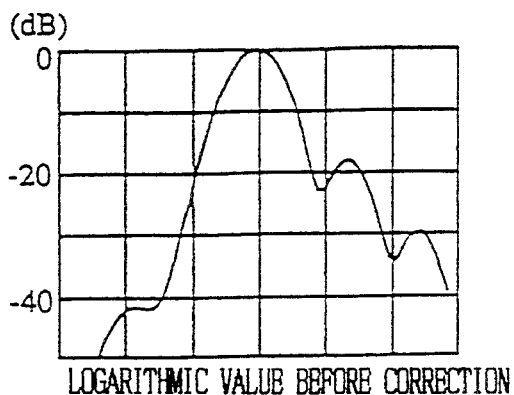
Figure 11:
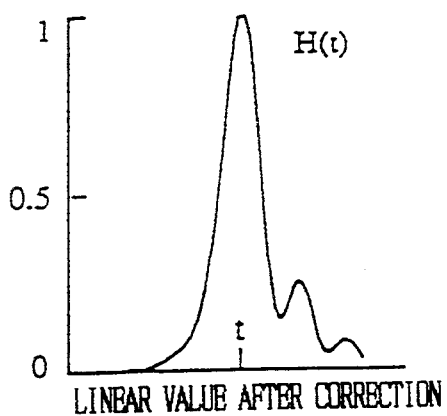
Figure 11:
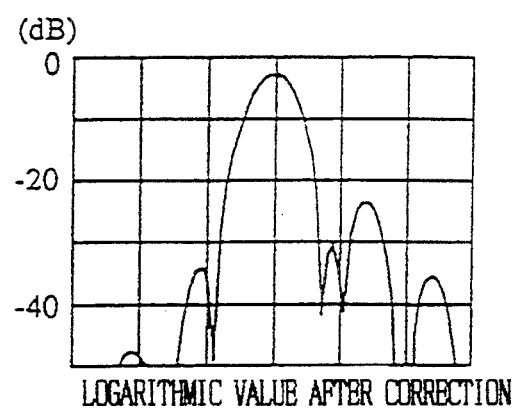
Figure 11C:
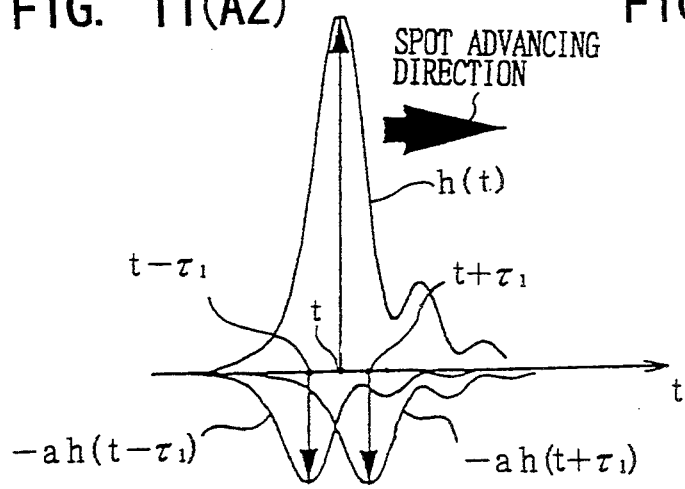

The transversal filter 91 consists of delay circuits 110 and 111 provided with a unit delay value $\tau_1$, fixed gain amplifying circuits 112, 113 and 114 provided with weighing coefficients selected sequentially to a, 1 and a, and an adder circuit 115 for adding the outputs of the amplifying circuits 112, 113 and 114. The composition of the transversal filter 91 is identical with that of the three-tap type equalizer described with reference to FIG. 8.

The transversal filter 92 is placed at a stage before the transversal filter 91 for connecting the delay circuit 116 provided with a unit delay amount $\tau_0$ to a prestage of the transversal filter 91, multiplying the signal obtained at an input terminal of the delay circuit 116 to changeable weighing coefficient b at the gain changeable amplifying circuit 117, and supplying the added number by the adder circuit 115 through an exchange circuit 118.

Additionally, the transversal filter 93 is placed before the transversal filter 91 so as to connect the delay circuit 119 of the unit delay amount $\tau_0$ to a post stage of the transversal filter 91, multiplying the signal obtained at an input terminal of the delay circuit 119 by the changeable weighing coefficient c at a gain changeable amplifying circuit 120, and inputting the added result to the adder circuit 115 through the exchange circuit 118.

The transversal filter 93 is placed at a poststage of the transversal filter 91 in order to connect the delay circuit 119 provided with the unit delay amount $\tau_0$ to a poststage of the transversal filter 91, multiplying the signal obtained at an input terminal of the delay circuit 119 by changeable weighing coefficient c at a gain changeable amplifying circuit 120, and inputting the resulting to the adder circuit 115 through the change circuit 118.

The exchange signal S11 for the exchange circuit 119 is formed in a comparator 121. The comparator compares a detection output S12 of the skew sensor 64 with a standard value (voltage) and send-out the exchange signal S11 of a logic 1 (or 0) when the detection output S12 becomes plus voltage (or minus value). Consequently, when the detection output S12 of the skew sensor 64 is positive (or negative), the exchange circuit 118 supplies output of the gain changeable amplifying circuit 120 (or 117) to the adder circuit 115 so as to control the filtering characteristic of the filtering means 90 changing the characteristic.

The gain control signal S13 for the gain changeable amplifying circuit 120 can be obtained by amplifying a detected output S12 of the skew sensor 64 at the amplifying circuit 122, and the gain control signal S14 for the gain changeable amplifying circuit 117 can be obtained by inverting the gain control signal S13 at an inversion amplifying circuit 123.

According to the structure above of the present invention, delay value of the filtering means 90 is determined by the following procedure.

The delay amount $\tau_2$ of the filtering means 90 shown in FIG. 34 expresses a delay amount of the original signal (t$=0$) and it is determined by the equation $\tau_2 = \tau_1 + \tau_0$.

The delay amount $\tau_2$ does not depend on the kind (the shortest repeating pit length) of reproducing signals and it depends only on an optical coefficient of the optical pick up.

When an aperture number of an object leans is NA and a wave length of the light source is $\lambda$, the central value of the delay amount $\tau_2$ is expressed by the following equation (22).

$$\tau_2 = 1.64 \frac{\lambda}{2NA} \qquad (22)$$

Here, the delay amount $\tau_2$ is selected so as to satisfy the relationship of the following equation (23) obtaining a sufficient effect on a practical wave shaping.

$$1.22 \frac{\lambda}{2NA} \leq \tau_2 \leq 2.23 \frac{\lambda}{2NA} \qquad (23)$$

When, for example, wave length $\lambda=0.532$ ($\mu$m) and NA$=0.6$, the central value of the delay amount $\tau_2$ is $\tau_2=0.73$ ($\mu$m) and the selected delay value is 0.54 ($\mu$m)$\leq\tau_2\leq$0.99 ($\mu$m).

Here, because that the delay amount $\tau_2$ in the equation (23) is expressed by a unit of length, on the contrary, it is given with a unit of time in the practical electric circuit, when a linear velocity is $v$, the delay value $\tau_2$ can be converted as shown in the following equation (24)

$$1.22 \frac{\lambda}{2NA \cdot v} \leq \tau_2 \leq 2.23 \frac{\lambda}{2NA \cdot v} \qquad (24)$$

and the center value of the delay amount $\tau_2$ is given by the following equation (25).

$$\tau_2 = 1.64 \frac{\lambda}{2NA \cdot v} \qquad (25)$$

When, for example, $v=6$ (m/sec), $\lambda=0.532$ ($\mu$m) and NA$=0.6$, the central value of the delay amount $\tau_2$ becomes 122 (nsec). However, in practical, if it falls in a range of 90 (nsec)$\leq\tau_2\leq$165 (nsec) of a variation of the equation (24), it may be shifted from the central value.

Next, a weighing coefficient is determined by the following procedure.

As shown in FIG. 34, in order to obtain a weighing coefficient for the delay amount $\tau_2$, a weighing coefficient b is given to a sample data h (t+$\tau_2$) and a weighing coefficient c is given to a sample data h (t−$\tau_2$).

The sample data h (t+$\tau_2$) and h (t−$\tau_2$) do not used simultaneously and anyone of them is selected in the selection circuit: 118 according to the pole phase of the detection output S12 of the skew sensor 64.

The values of the weighing coefficients b and c of the sample data h (t+$\tau_2$) and h (t−$\tau_2$) are adjusted to the value proportional to the absolute value of the detection output S12 of the skew sensor 64 and weighing coefficients b and c of the sample data h (t+$\tau_2$) and h (t−$\tau_2$) are settled so as to negatively weight the original signal h (t).

Figure 35A:
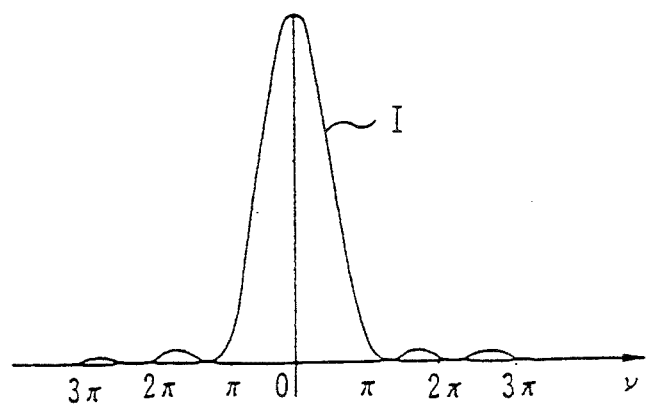
FIGS. 35(A) to 35(C) are characteristic curve diagrams depicting light spread functions.

By the way, as described above, a light spot emitter from the light source 46, focussed through the object lens 51, and placed on the optical disc 42 has a uniform distribution of light over the optical disc 42, and a strength distribution of diffracted images obtained through the circular opening without a focussing differential can be expressed by the following equation (26) as Bessel primary function shown in FIG. 35(A).

$$I = \left[\frac{2J_1(v)}{v}\right]^2 \quad (26)$$

It is called airy ring or airy disc having its bright points at $v=0$, $v=1.64\pi$, $v=2.69\pi$, and $v=3.51\pi$ ... and its dark points (I=0) at $v=1.22\pi$, $v=2.23\pi$, $v=3.23\pi$ ...

Here, when a light strength distribution on the optical disc 42 is expressed by the equation (26) (here an object lens aperture number of the pick up is NA, light source wave length is $\lambda$, and a length on the disc 42 is X), a relation between $v$ and X expressed by the following equation (27).

$$v = 2\pi \frac{NA}{\lambda} X \quad (27)$$

Consequently, the points expressed by the following equation (28) are bright points and these expressed by the equation (29) are dark points.

$$X = 0, 1.64 \frac{\lambda}{2NA}, 2.69 \frac{\lambda}{2NA}, 3.51 \frac{\lambda}{2NA}, \quad (28)$$

$$X = 1.22 \frac{\lambda}{2NA}, 2.23 \frac{\lambda}{2NA}, 3.23 \frac{\lambda}{2NA}, \quad (29)$$

Accordingly, the delay amount of the filtering means 90 (FIG. 34) is determined a value in the range of the equation (23).

Figure 35B:
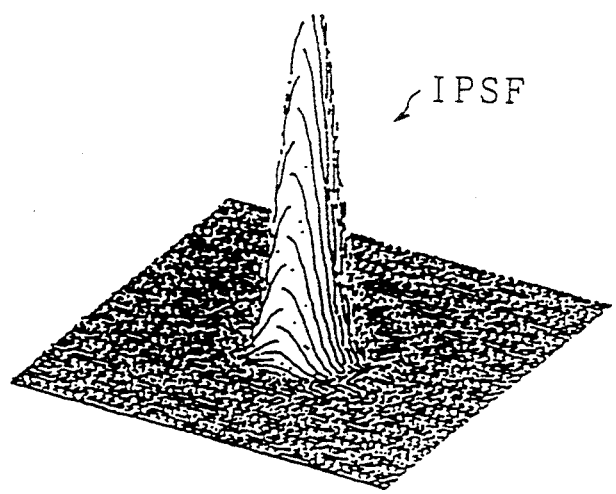
Figure 35C:
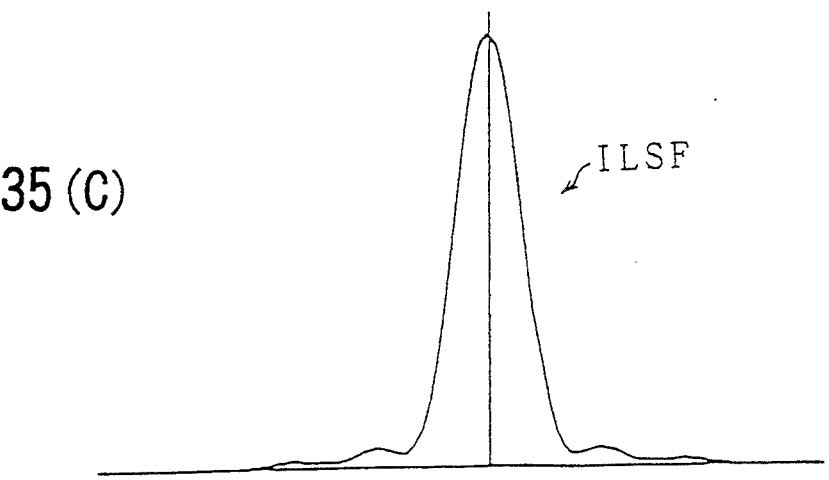

As a result, a filtering output obtained from the filtering means 90 as shown in FIG. 35(B) can be expressed by a secondary point strength distribution or point spread function IPSF. Further, by weighing the point strength distribution or point spread function after projecting it on a single axis, it is possible to express the point spread distribution as ILSF (line spread function).

According to a system having the optical disc 42 provided with an axis or track along which a spot moves in order to read signals, using such line spread function makes the phenomenon relatively easy to be gripped.

The line spread function shown in FIG. 35(B) has a characteristics of the distribution of bright points and dark points shown in FIG. 35(A). In this case, it takes very small value and does not become zero at even the dark points.

Figure 1A:
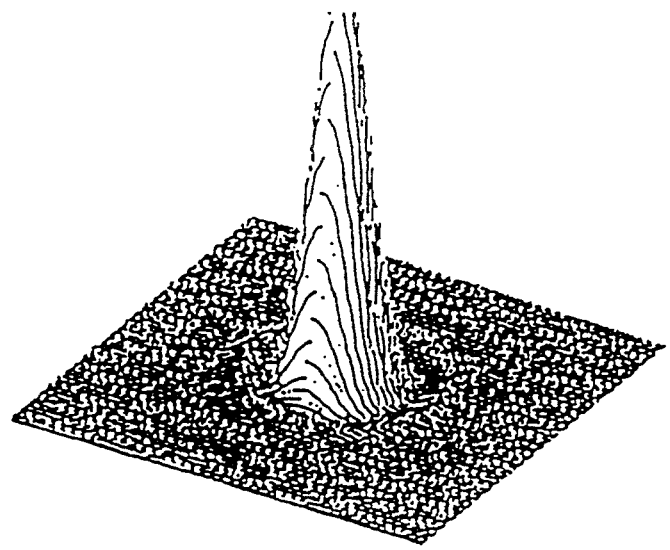
FIGS. 1(A) and 1(B) are perspective and characteristic curve diagrams depicting point spread function and line spread function at skew angle 0°.
Figure 1B:
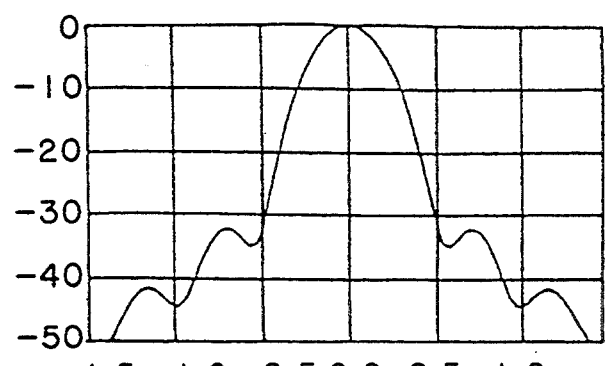
Figure 2A:
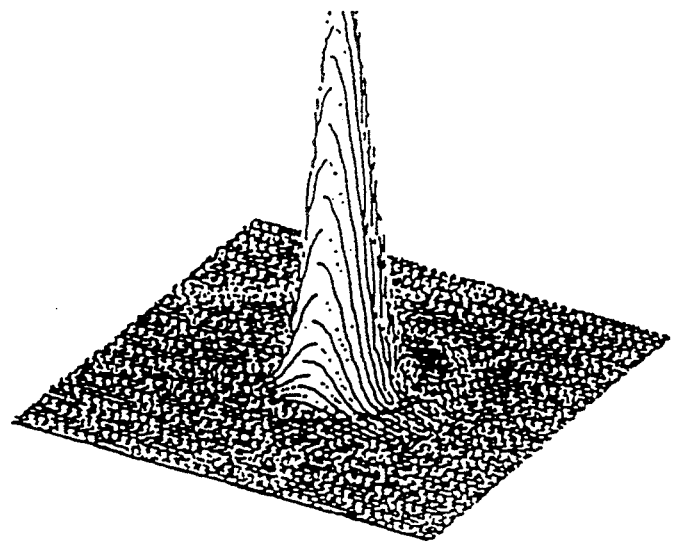
FIGS. 2(A) and 2(B) are perspective and characteristic curve diagrams depicting point spread function and line spread function at skew angle 0.1°.
Figure 2B:
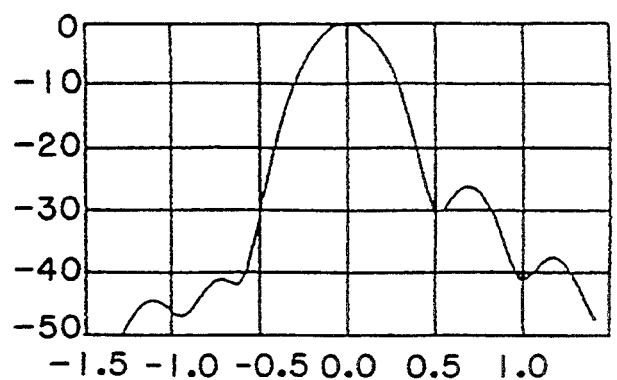
Figure 3A:
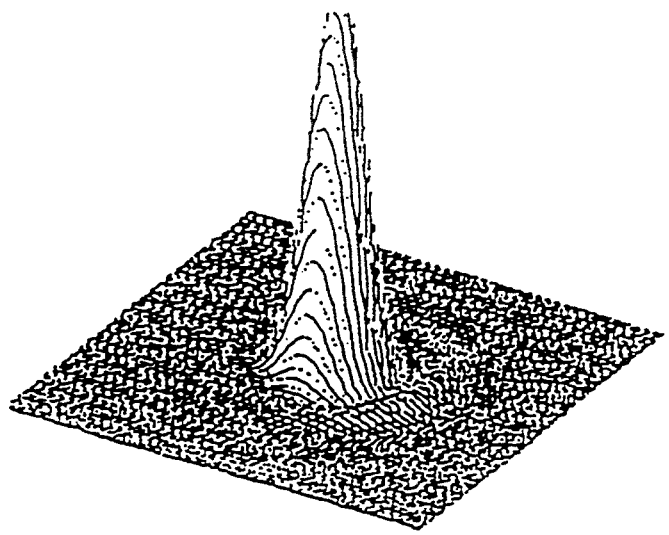
FIGS. 3(A) and 3(B) are perspective and characteristic curve diagrams depicting point spread function and line spread function at skew angle 0.2°.
Figure 3B:
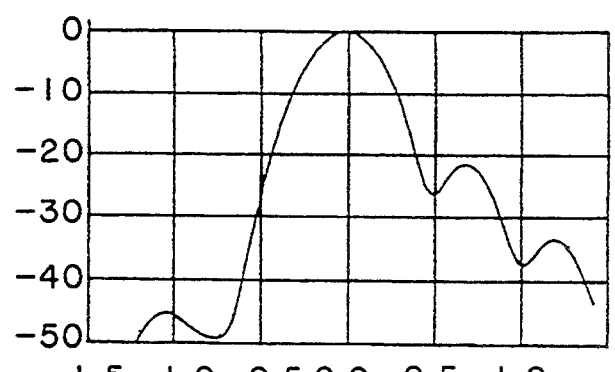
Figure 4A:
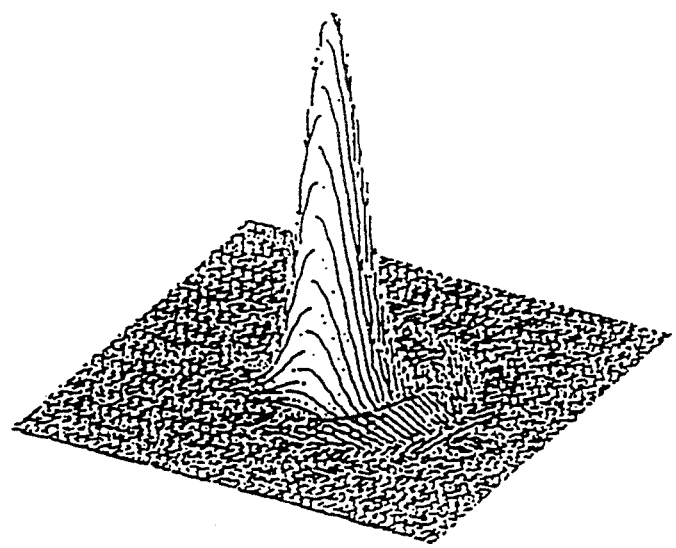
FIGS. 4(A) and 4(B) are perspective and characteristic curve diagrams depicting point spread function and line spread function at skew angle 0.3°.
Figure 4B:
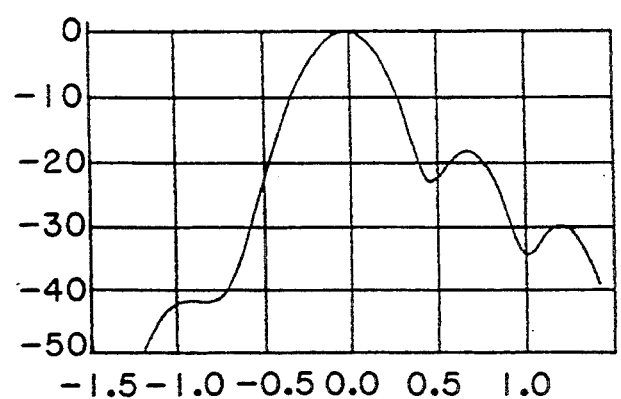
Figure 5A:
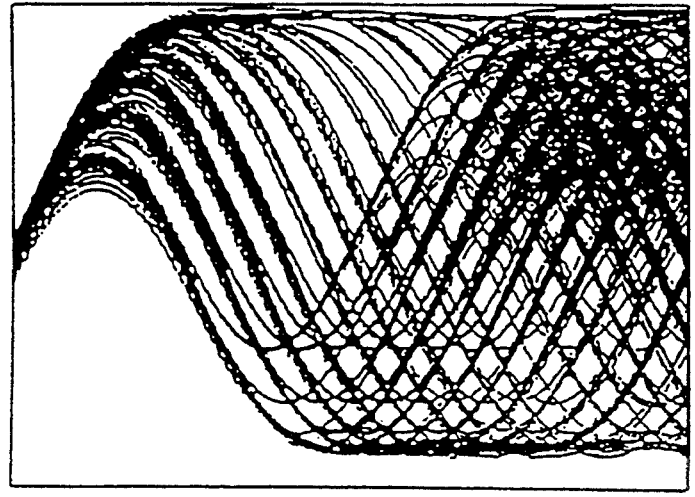
FIGS. 5(A) and 5(B) are signal wave form diagrams depicting eyepattern at a tangential skew 0°.
Figure 5B:
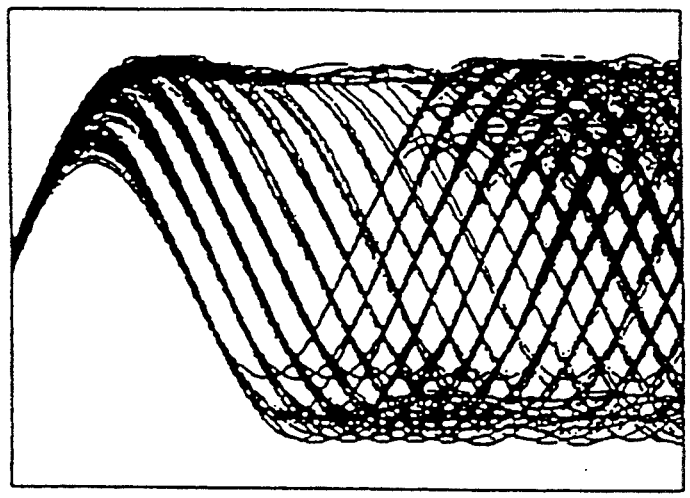
Figure 6:
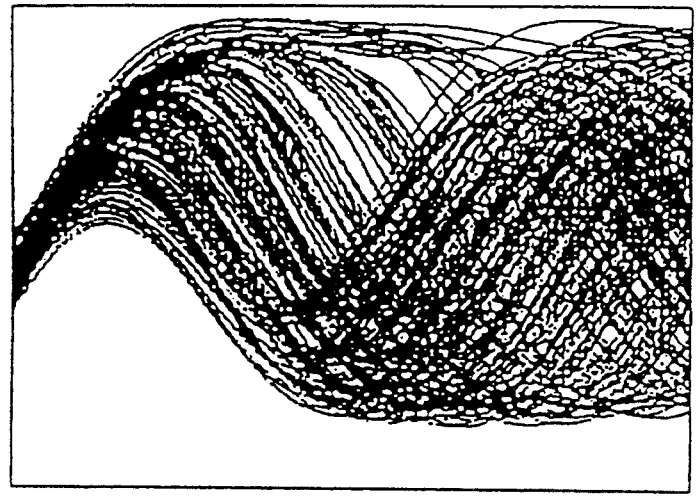
FIGS. 6(A) and 6(B) are signal wave form diagrams depicting eyepattern at a tangential skew 0.3°.
Figure 6:
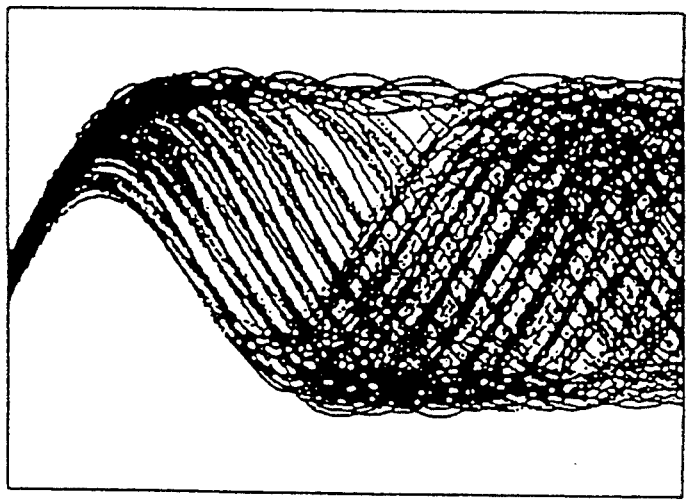
Figure 7:
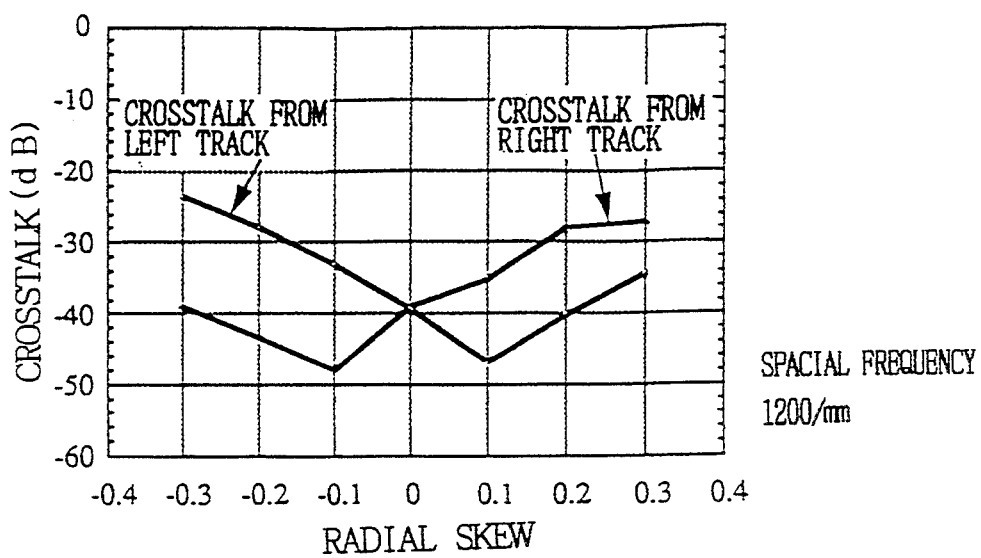
FIG. 7 is a characteristic curve diagram showing radial skew dependency of crosstalk.

However, as described previously, when the optical disc 42 is skewed and consequently the optical disc 42 inclines relative to an optical axis of the object lens, comatic aberrations shown in the equations (1) and (2) are generated and non-symmetrical side robe is generated as shown in FIG. 2, FIG. 3 and FIG. 4. As described with reference to FIG. 5 and FIG. 6, wave strain in the three-tap type equalizer can not removed.

According to the embodiment of FIG. 34, it is constructed as a five-tap type equalizer in order to remove non-symmetrical portions around $\tau_2$ which are not removed by the three-tap type equalizer.

Figure 36A:
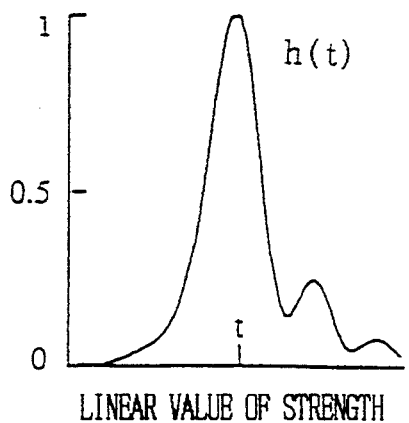
FIGS. 36(A) to 36(D) are characteristic curve diagrams of changeable five-tap type equalizer shown in FIG. 34.
Figure 36B:
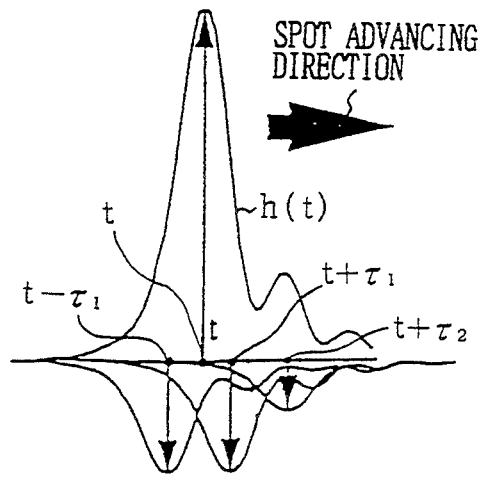
Figure 36C:
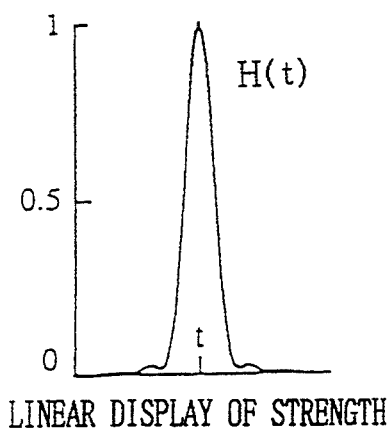
Figure 36D:
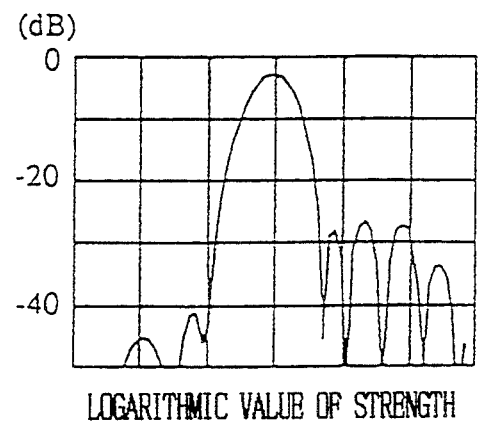

That is, the spread function linearly displayed before correction by the five-tap type equalizer has non-symmetrical side robe shown in FIG. 36(A). On the contrary, when an overlapping correction of the side robes is done by means of the five-tap type equalizer as shown in FIG. 36(B) by a case in which the coefficient of h (t−$\tau_2$)is zero, spread functions of linear display and functional display after the correction by the five-tap type equalizer have as shown in FIGS. 36(C) and 36(D) a characteristic of narrow width. It is understood that the non-symmetrical side robes are more effectively remove than that of three-tap equalizer.

Here, the central value of non-symmetry is $\tau_2$ and this is a delay value too. It is expressed described by the equation (22).

The reason for that is that the spread function on the surface of the object lens of the pick up of the optical disc 42 is not of a complete uniform distribution and it is of a Gaussian distribution expressed by the following equation (30).

$$I = \exp\left[-\frac{2x^2}{\omega x^2} \cdot \frac{2y^2}{\omega y^2}\right] \quad (30)$$

Supposing that a track direction of the optical disc 42 is X direction and a radius of the object lens is r, an index r/$\omega$x showing a uniformity of spread function becomes about 0.2 to 0.8. It is possible to think that it can be threaded in a manner of the diffraction through a circular opening having almost uniform spread function or strength distribution.

Next, an effect of weighing coefficient is considered. Respective figures of FIGS. 37(A), 37(B) and 37(C) show respective line spread functions in functional manner of the cases of that the disc skew is 0°, 0.1°, 0.2°, 0.3° at each case of "only optical system", of "fixed three-tap equalizer", and of "changeable five-tap type equalizer".

Figures 37A, 37B, 37C:
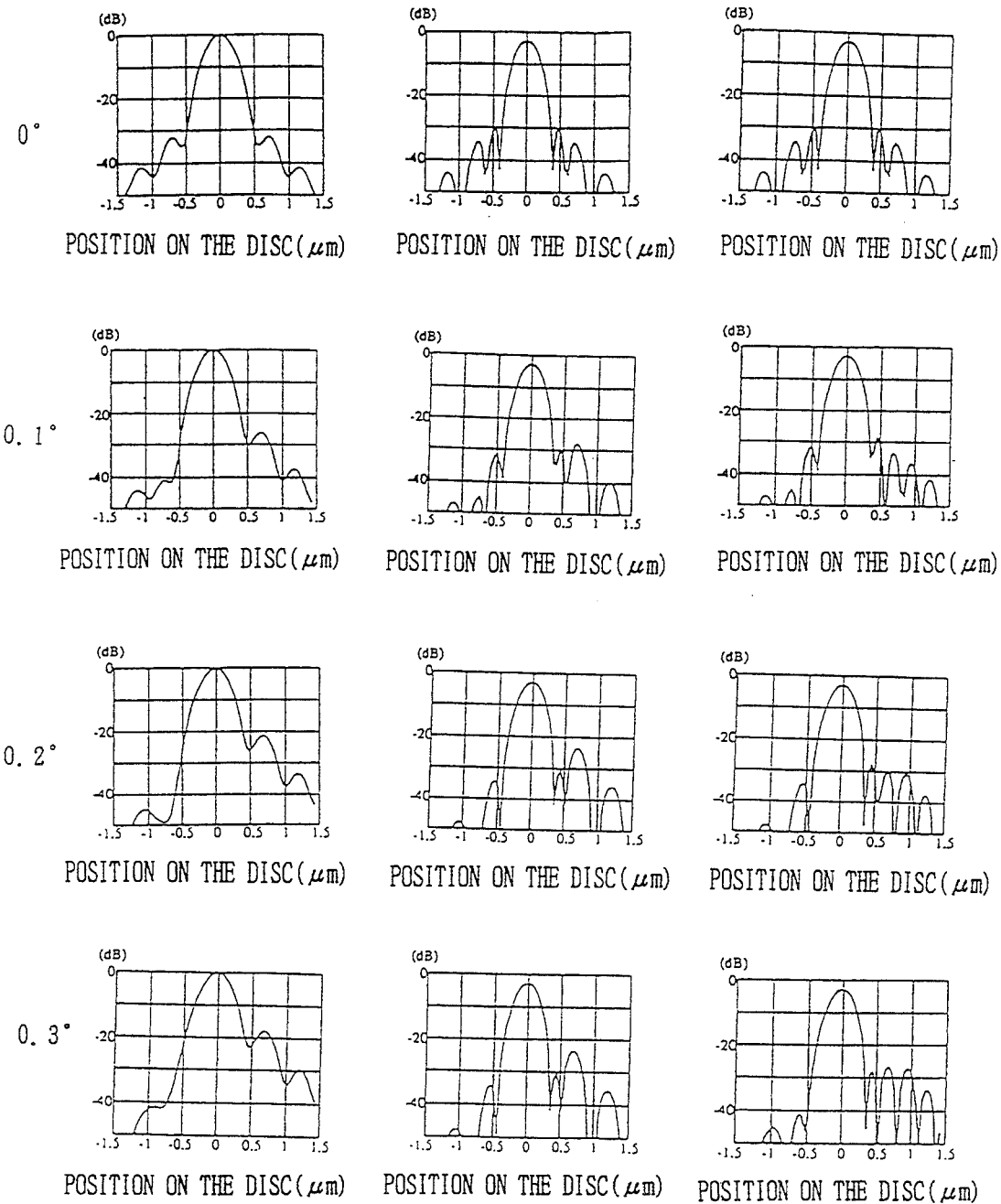
FIGS. 37(A) to 37(C) are characteristic curve diagrams depicting the equal value line spread functions of an equalizer.

Comparing the case of "only optical system" of FIG. 37(A) to that of "fixed three-tap equalizer" of FIG. 37(B), it is found that the ratio of the value of side robes raised by the disc skew and the central peak value, and disc skew value is substantially proportional one.

Accordingly, when the coefficient is made a value proportional to the disc skew value after the coefficient is determined making the side rob of the least at, for example, 0.3° of the disc skew, it is understood that it is possible to lessen or decrease any effect of non-symmetricity of the side robes. For example, when the disc skew is 0°, the coefficient becomes zero.

In case of "changeable five-tap type equalizer" shown in FIG. 37(C), the weighing coefficient can be made to be proportional to the disc skew obtaining accordingly a result of the decreasing value of side robes in spite of the disc skew.

Here, it is enough to use either +$\tau_2$ and −$\tau_2$ as to weighing procedure. The selection of +$\tau_2$ and −$\tau_2$ is determined according to the direction of disc skew. It is selected to a side at which the side robe is formed.

Next, the embodiment of the invention will be explained with the practical figures.

The constants of the light pick up of the optical disc are shown below.

$\lambda = 0.532$ ($\mu$m),

NA=0.6, r/$\omega$x=0.7, r/$\omega$y=0.7

The constants of three-tap type equalizer are shown below.

$\tau_1 = 0.2$ ($\mu$m),

A=−0.2

In case that $\tau_2 = 0.73$ ($\mu$m), linear velocity is 6 (m/sec), the delay amount is expressed by time as shown below, $\tau_1 = 33$ (nsec), $\tau_2 = 122$ (nsec), wherein, the weighing coefficient to be changed by the disc skew value becomes b=c=$-2|\theta|$: $\theta(\theta(°))$.

For example, in case that $|\theta|=0.1°$, b=c=−0.02 is obtained.

In case that $|\theta|=0.2°$, b=c=−0.04 is obtained.
In case that $|\theta|=0.3°$, b=c=−0.06 is obtained.

Figure 38:
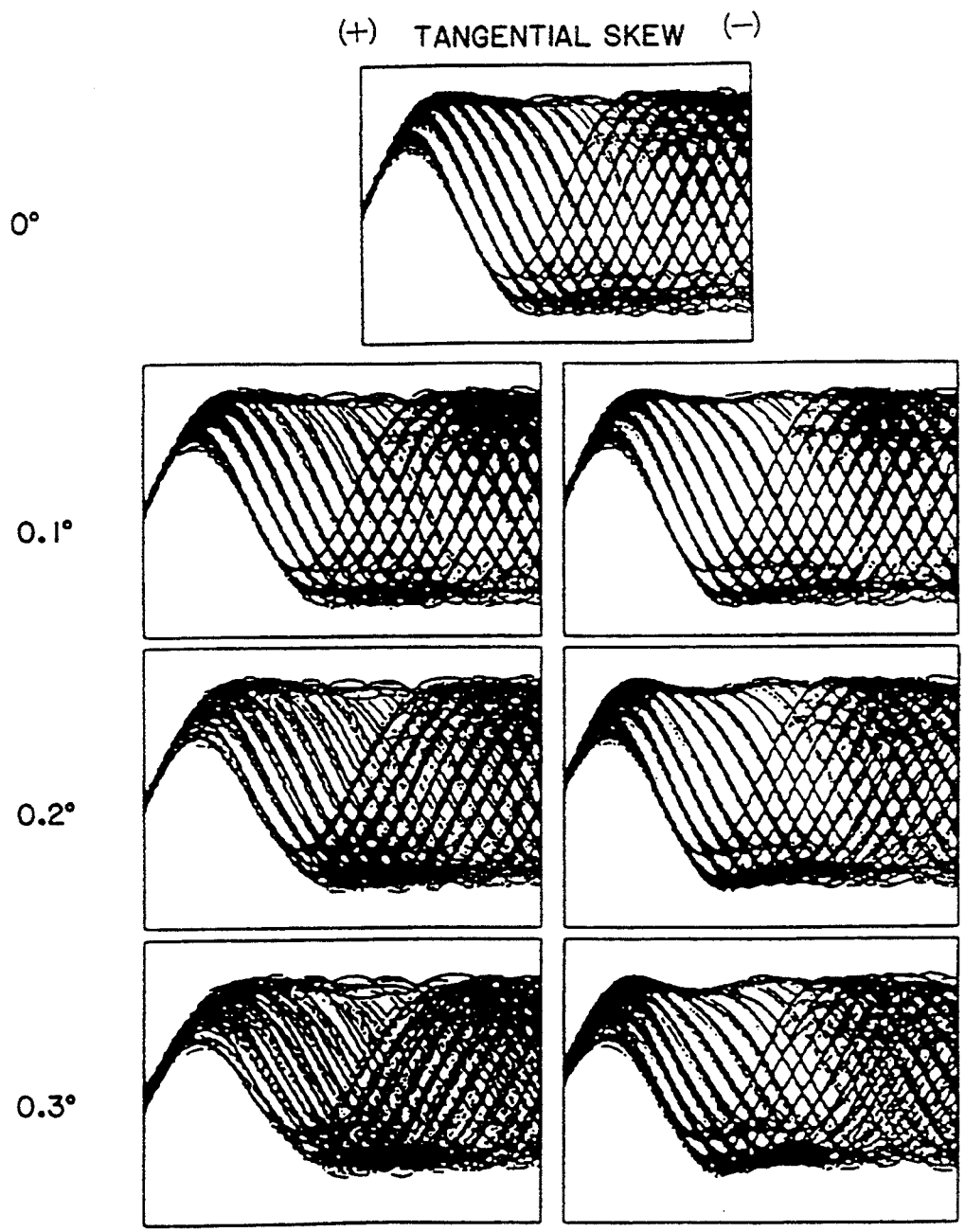
FIG. 38 is a signal wave form view of eyepatterns obtained by correction of fixed three-tap type equalizer.
Figure 39:
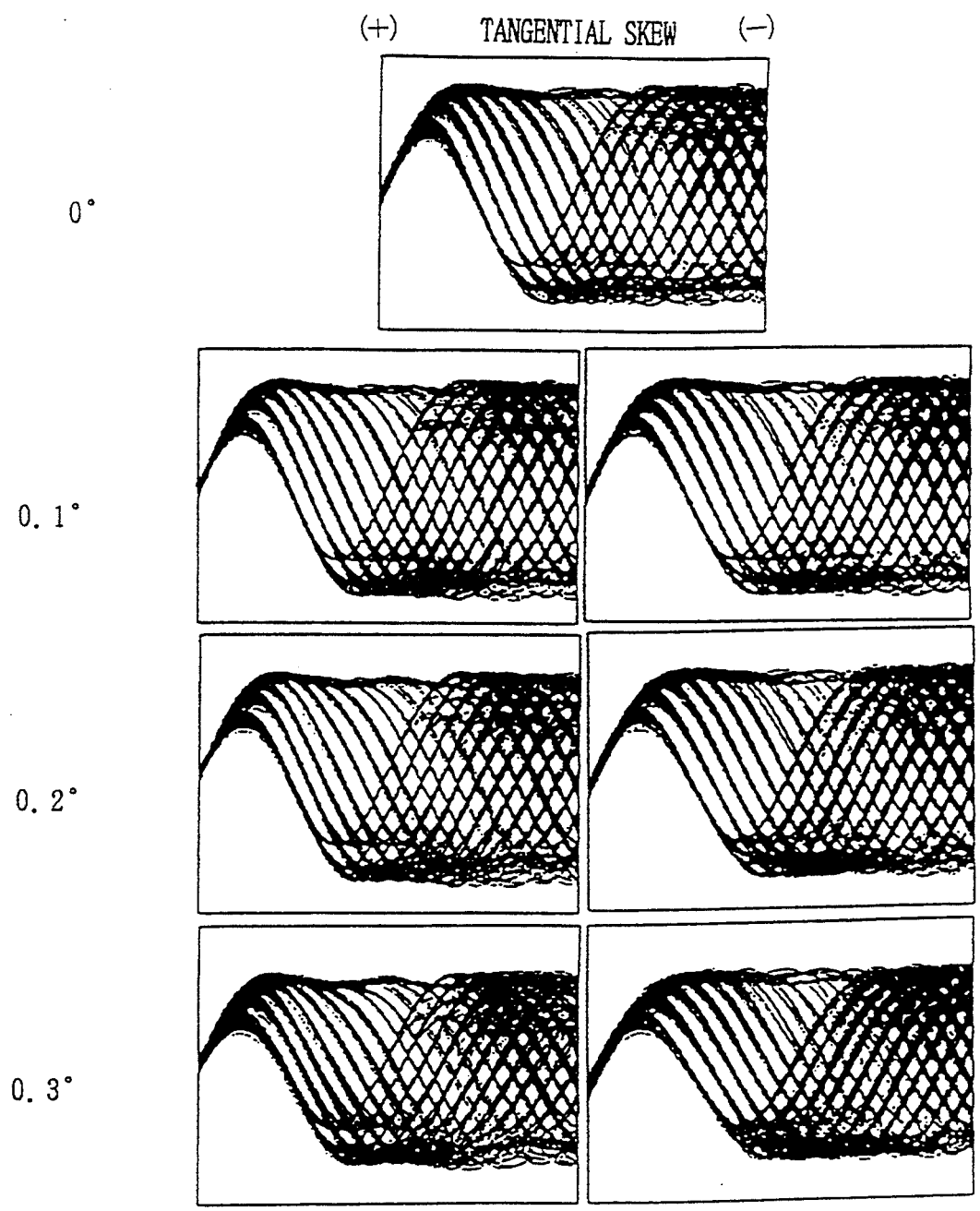
FIG. 39 is a signal wave form diagram depicting eyepattern obtained by a correction of changeable five-tap type equalizer.
Figure 40:
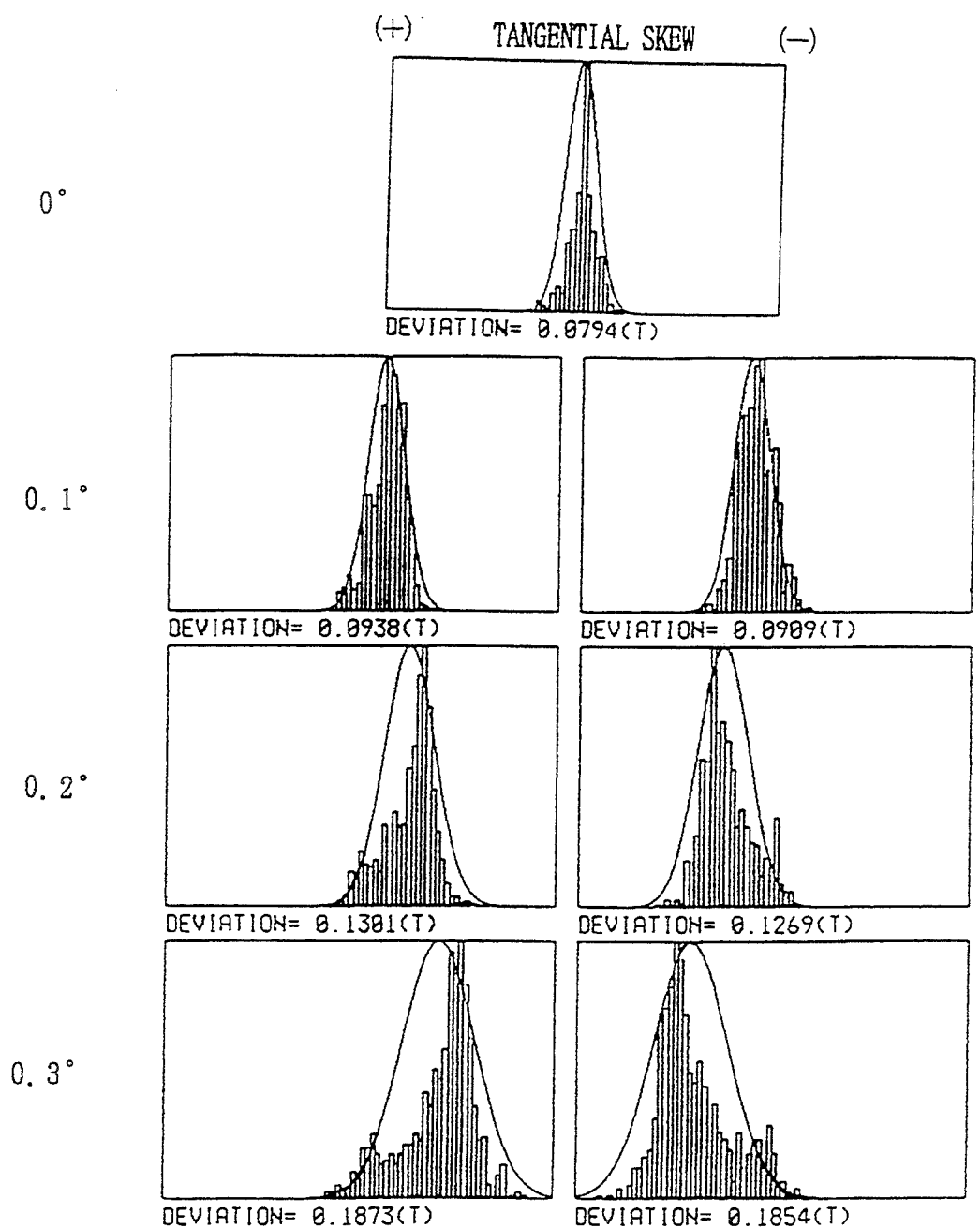
FIG. 40 is a characteristic curve diagram depicting a dependency on a disc skew of jitter histogram of three-tap type equalizer.
Figure 41:
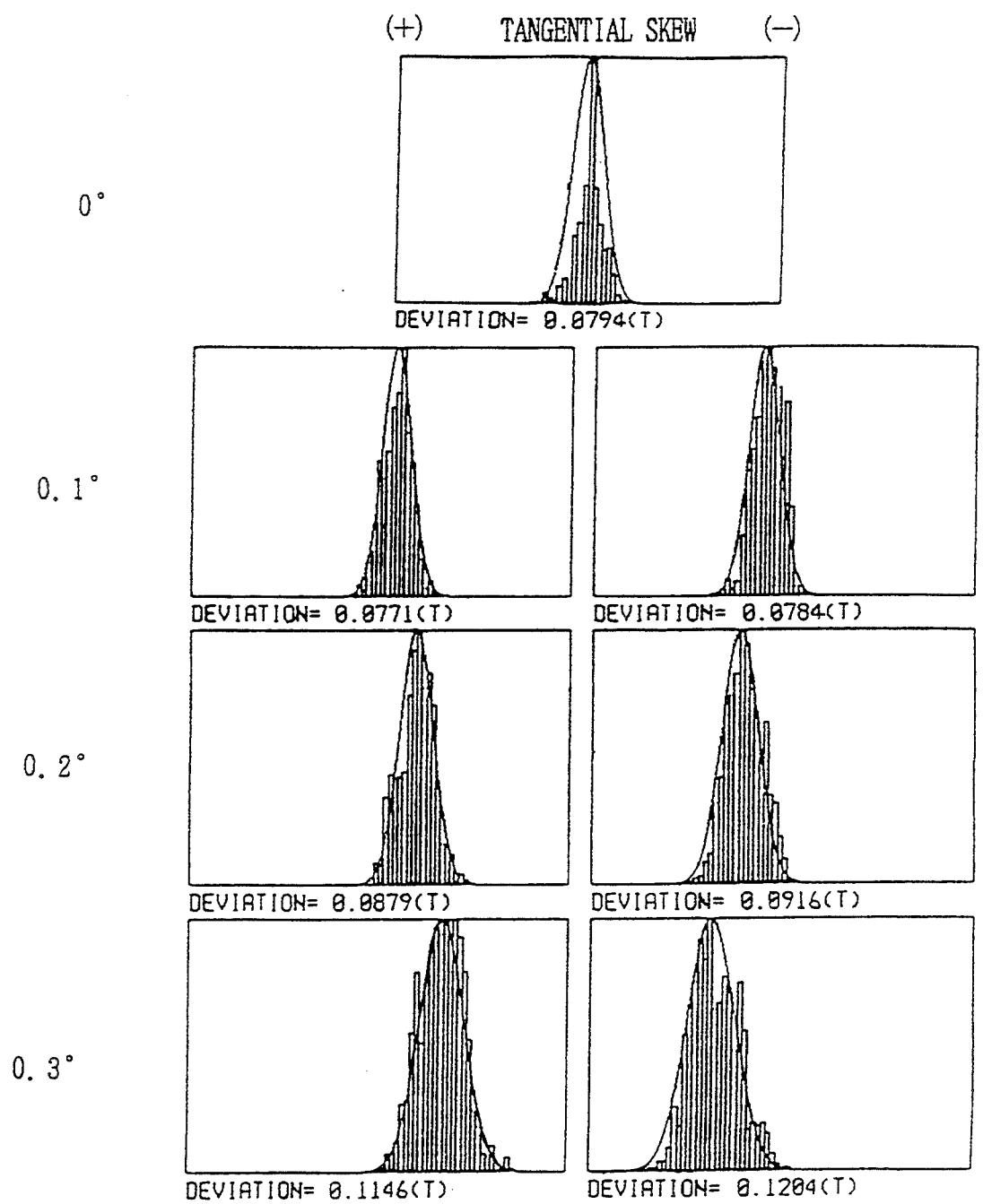
FIG. 41 is a characteristic curve diagram depicting a dependency on a disc skew of jitter histogram of five-tap type equalizer.

Eye patterns when the constants above are selected, the disc skew value is −0.3° to +0.3°, and only the conversational three-tap type equalizer is used, and when five-tap type changeable transversal filter is used as shown in FIG. 38 and FIG. 39. Jitter histograms are shown in FIG. 40 and FIG. 41.

Figure 42:
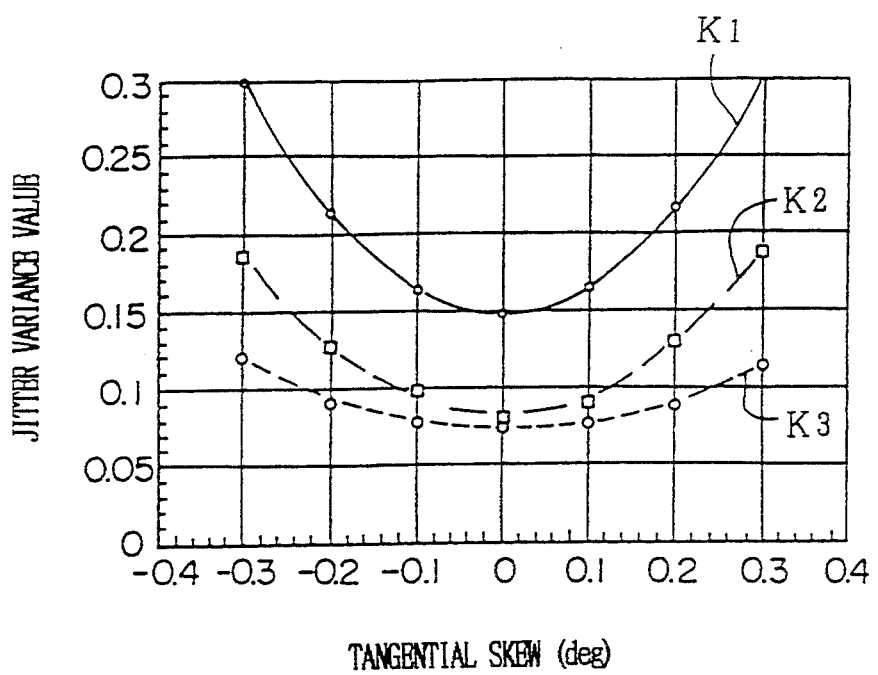
FIG. 42 is a characteristic curve diagram showing jitter variance value to tangential skew.

FIG. 42 is a graph provided with an abscissa expressing the tangential optical disc skew value and an ordinate expressing the jittered scattered values (standard deviation value) ruled by a window T. In the graph, a curve K1 shows a case without equalizer, curve K2 shows a case using three-tap type equalizer, and curve K3 depicts five-tap type equalizer.

As shown in FIG. 42, it is understood that the jitter decreases relative to the disc skew of the present invention making the detection signals easy.

An output signal of the changeable equalizer of the present invention obtained by the operations above is inputted in a data reproducing circuit (not shown) of the optical disc apparatus 41 and thus the data memorized in the optical disc 42 reproduced.

Figures 43A, 43B, 43C:
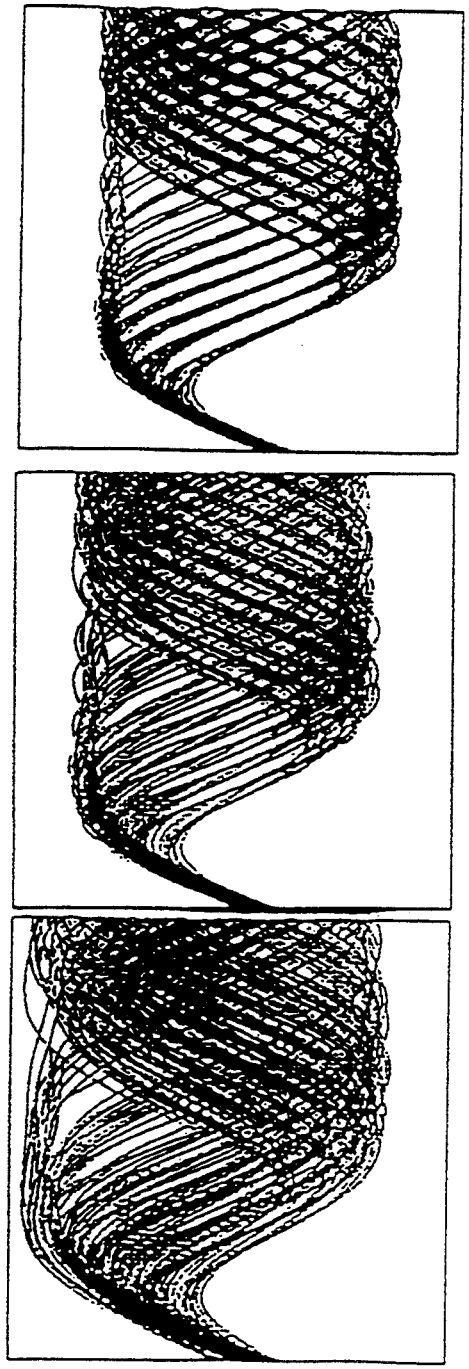
FIGS. 43(A) to 43(C) are signal wave form views depicting eyepatterns at tangential skew 0.3°.

The reproducing wave shape (eye pattern) obtained in the case of the tangential skew is 0.3° in the optical disc apparatus 41 as shown in FIG. 43(C) has few wave strain when it is compared to the eye pattern of the case using no equalizer as shown in FIG. 43(A) and to other eye pattern of the case using the conventional three-tap type equalizer shown in FIG. 43(B), resulting in an easy drawing-out of the signals.

According to an electric correction by the filtering apparatus 90 shown in FIG. 34, the following effects can be obtained.

Even the object lens aperture number NA is large, it is possible to electrically correct strain in reproduced wave form due to comatic aberration generated by the disc skew, thus it is possible to obtain a more economic and high density optical disc system.

Secondary, it is possible to electrically correct strain in the reproduced wave form due to comatic aberration generated by the disc skew event trough the object lens aperture number NA is large, thereby it is possible to obtain a high reliability and high density optical disc system.

Third, because that it is possible to enlarge the capacity or permittability of disc skew as described above, it is possible to obtain a high density optical disc apparatus provided with an optical disc of a low manufacturing cost even though it is a high density disc product.

(6) Other Embodiments

Figure 44:
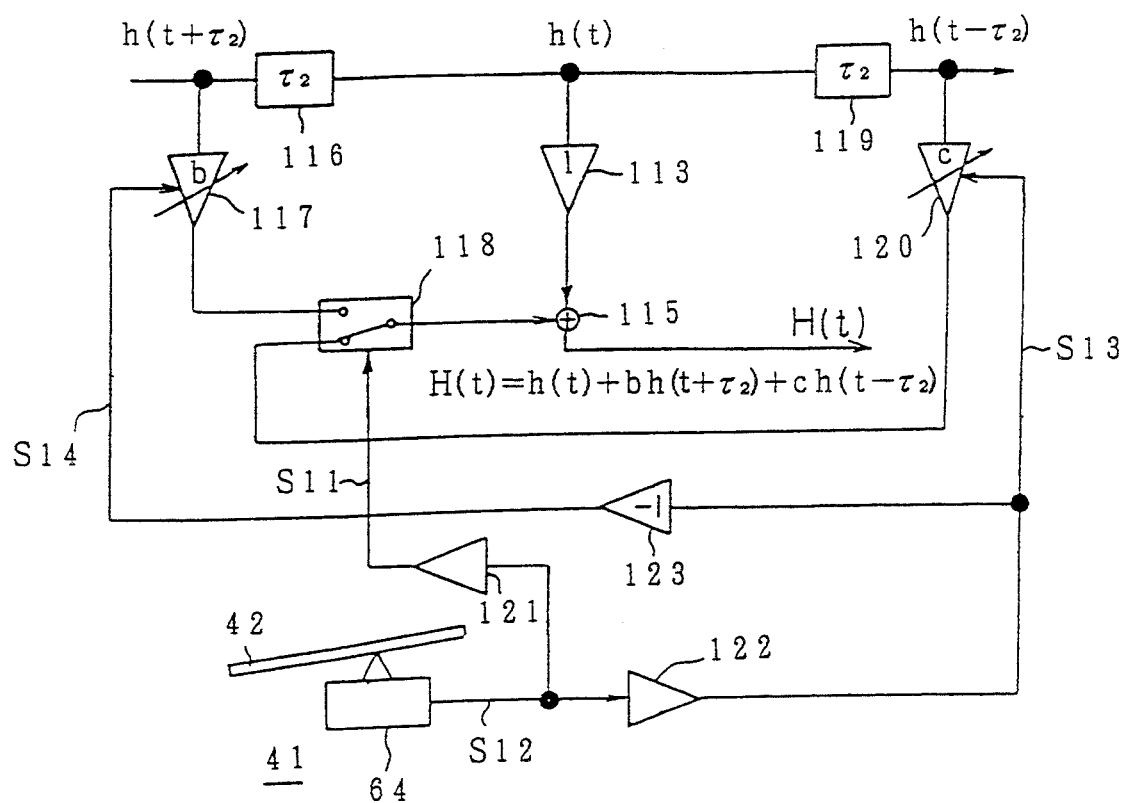
FIG. 44 is a block diagram of the fifth example of the optical disc apparatus according to the present invention.

FIG. 44 shows another embodiment of the optical disc apparatus of the present invention shown in FIG. 34. Parts corresponding to these shown in FIG. 34 have the same reference numerals. It is apparent from FIG. 44 that it does not have the parts or members of three-tap type equalizer EQ shown in FIG. 8. This is applied to, for example, a compact disc apparatus.

The filtering means 90 shown in FIG. 44 is obtained by combining the delay circuits 110 and 111 of a unit delay value $\tau_1$ to the delay circuits 116 and 119 of a unit dt delay value $\tau_0$, respectively shown in FIG. 34. The structure of the filtering means 90 is identical with that in which these delay circuits are replaced by the delay circuits 125 and 126 of a unit delay value $\tau_2(=\tau_1+\tau_0)$.

Figure 45:
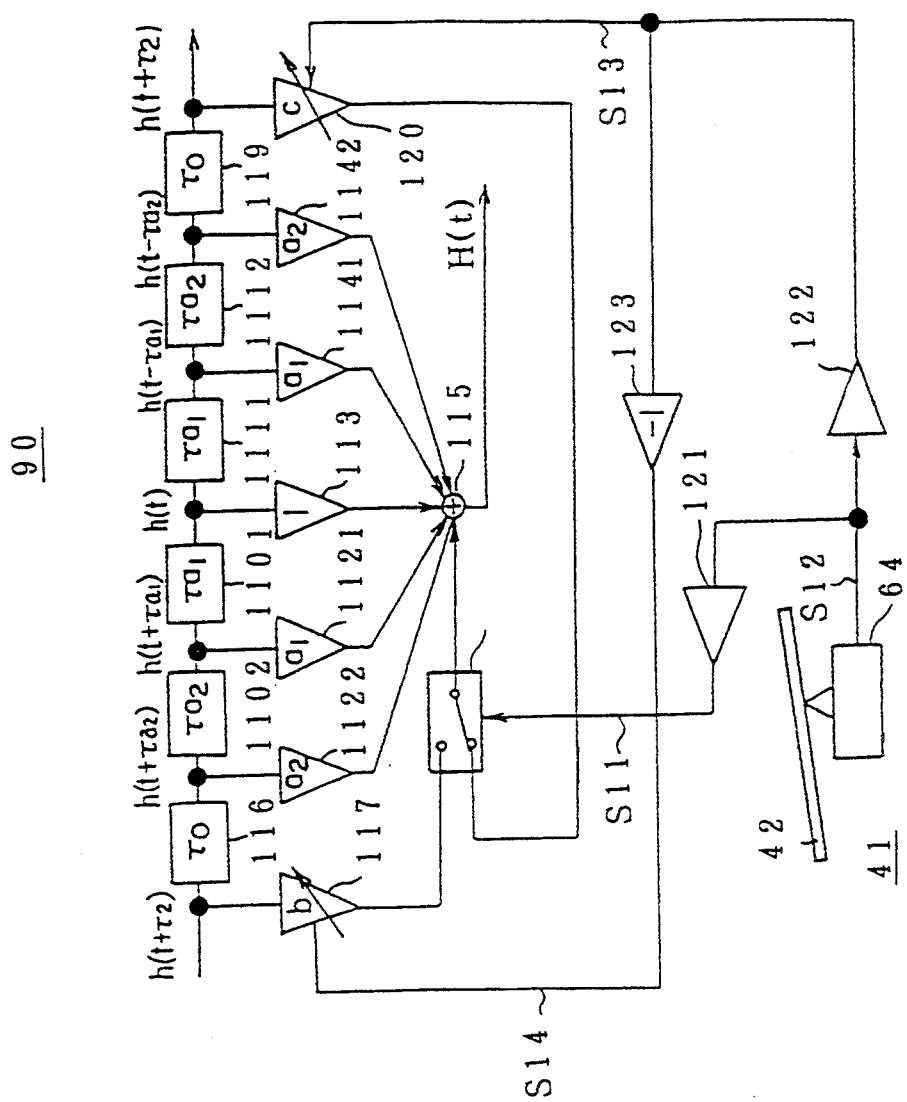
FIG. 45 is a block diagram of another example of the optical disc apparatus according to the present invention.

FIG. 45 shows still another embodiment of the previous embodiment shown in FIG. 34. According to the embodiment shown in FIG. 45, the filtering means 90 has the structure formed by replacing the delay circuits 110 and 111 of a unit delay value $\tau_1$ with two delay circuits 1101, 1102 and 1111, 1112 of unit delay values $\tau_{a1}$ and $\tau_{a2}$ ($\tau_1 = \tau_{a1} + \tau_{a2}$), respectively as shown in FIG. 34 depicting the corresponding portions with the same reference numerals. Consequently, it is possible to obtain tap outputs: h (t+$\tau_{a2}$), h (t+$\tau_{a1}$), h (t), h (t−$\tau_{a1}$), h (t−$\tau_{a2}$) from five tapes in spite of three taps of the three-tap type equalizer. These outputs are adapted to be supplied to the adder circuits 115 through amplifier circuits a2, a1, 1, a1, a2.

Thus, only increasing the tap number of the three-tap type equalizer improves precision of the detection signals.

When the tap number of the three-tap type equalizer increases more than four, it is possible to obtain the same effect as that of ht previous embodiments.

Figure 46:
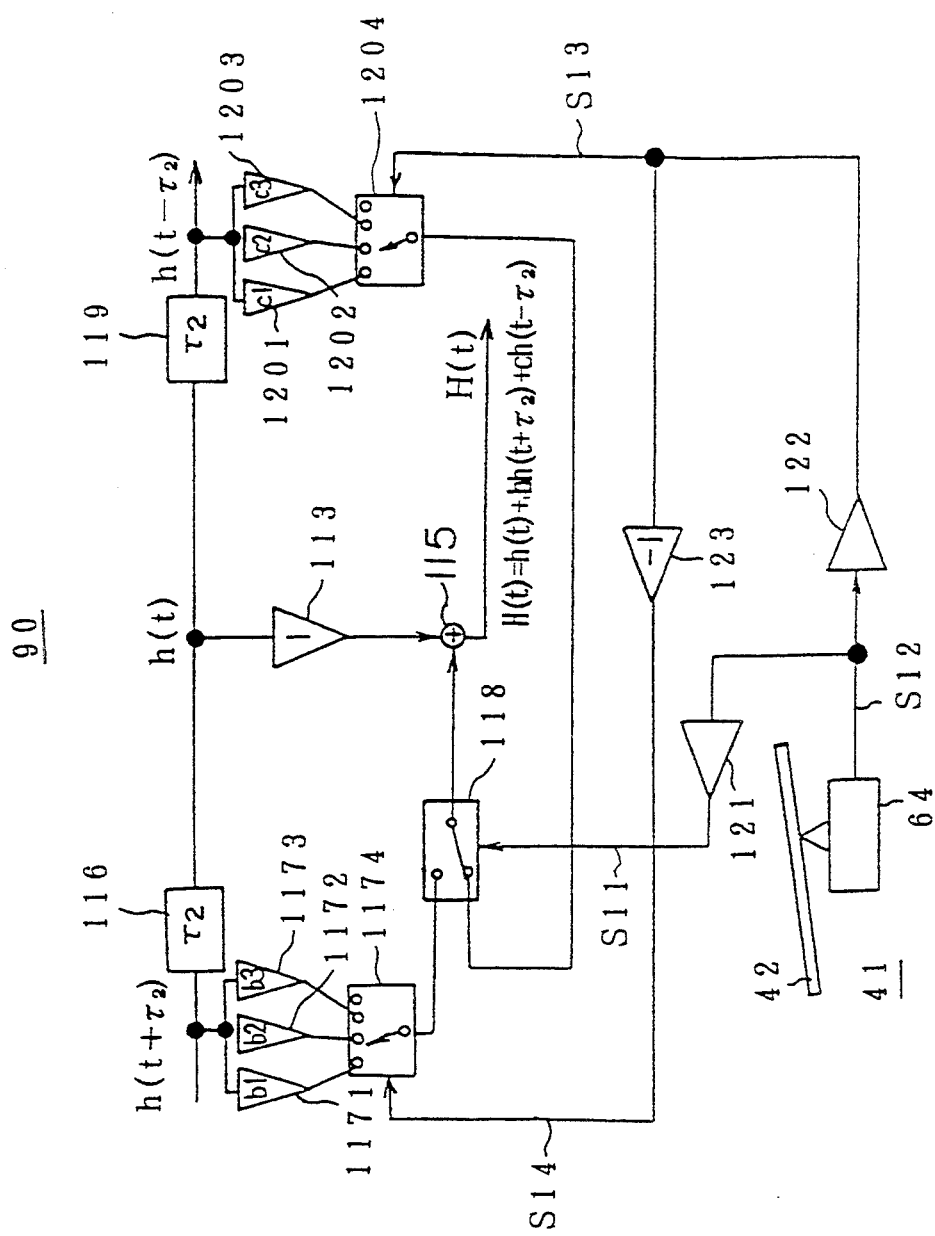
FIG. 46 is a block diagram of other embodiment of the optical disc apparatus according to the present invention.

FIG. 46 shows another embodiment of the optical disc apparatus shown in FIG. 44, which has the corresponding members having the same reference numerals as that of FIG. 44. According to the optical disc apparatus shown in FIG. 44, the gain changeable amplifying circuits 117 and 120 are replaced with gain fixed amplifying circuits 1171, 1172, 1173 and 1201, 1202, 1203, respectively having fixed gains b1, b2, b3 and c1, c2, c3, and outputs of these gain fixed amplifying circuits 1171, 1172, 1173 and 1201, 1202, 1203 are selected by the exchanging circuits 1174 and 1204 using gain control signals S14 and S13 in order to obtain tap outputs weighed corresponding to gain exchanging signals from the exchanging circuits 1174 and 1204.

According to the structure of the optical disc apparatus of the present invention shown in FIG. 46, the functions and effects identical with that of the gain changeable amplifying circuits 117 and 120 shown in FIG. 44 can be attained.

FIG. 45 depicts further other embodiments of that shown in FIG. 34. In the optical disc apparatus shown in FIG. 45, the filtering means 90 is composed by replacing the gain to apply the present invention to the changeable amplifying circuits 117 and 120, shown also in FIG. 34, with the gain fixed amplifying circuits 1171, 1172, 1173 and 1201, 1202, 1203, respectively having fixed gains b1, b2, b3 and c1, c2, c3, as well as outputs of the gain fixed amplifying circuits 1171, 1172, 1173 and 1201, 1202, 1203 are selected by exchangeable circuits 1174 and 1204 using gain control signals S14 and S13. At least, tap outputs weighed corresponding to the gain exchangeable signals can be obtained from the exchangeable circuits 1174 and 1204.

Figure 47:
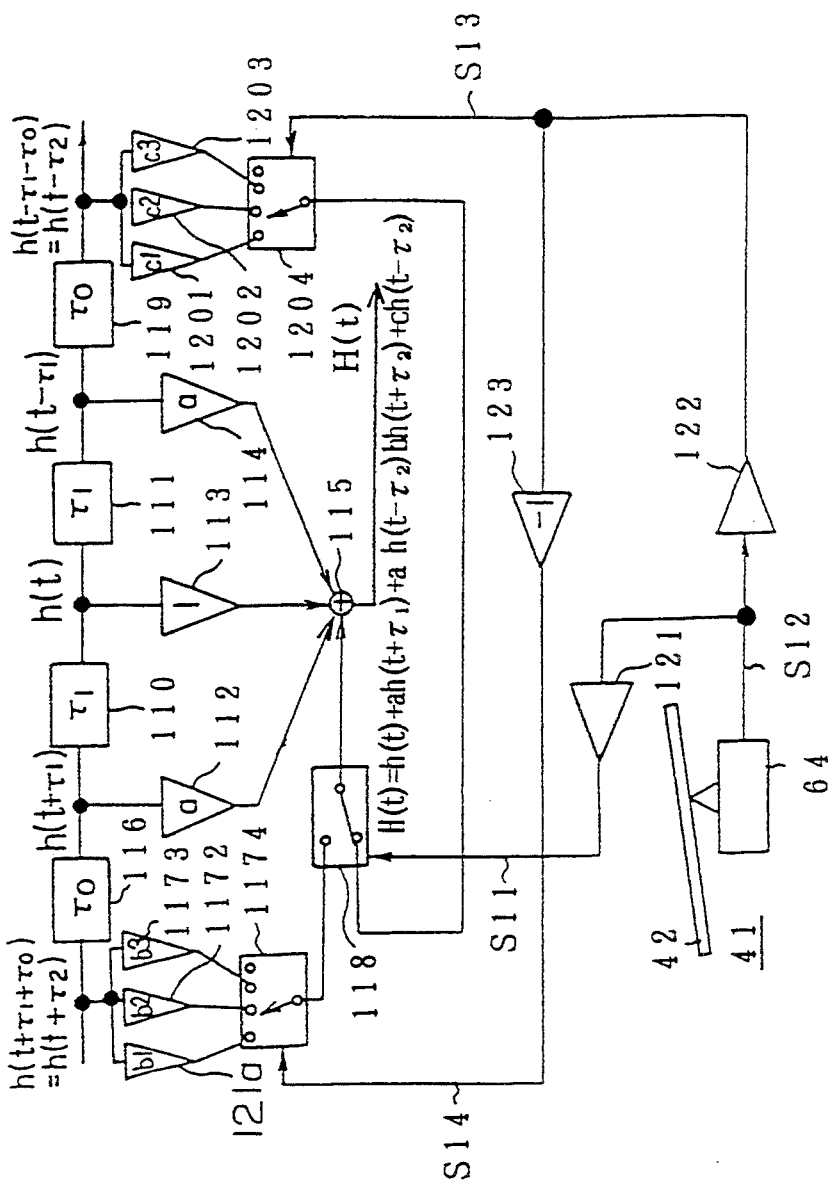
FIG. 47 is a block diagram of still another embodiment of the optical disc apparatus according to the present invention.

The system shown in FIG. 47 has the function and effects corresponding to that of the gain changeable amplifying circuits 117 and 120 shown in FIG. 34.

Consequently, according to the present invention, a simple structure having "no equalizer" attain substantially equal effects to that of the optical disc apparatus described above.

According to the embodiment shown in FIG. 46 and FIG. 47, the exchangeable circuits 1174 and 1204 have four changeable terminals including an input terminal provided with not input. Concerning a number of change, it may be good if it is two and more two including zero step.

It is noted that the present invention can be applied to various structures and is not limited to the optical disc apparatus 41 having the structure described above.

In particular, respective delay circuits and amplifying circuits constructing changeable equalizers used in the optical disc apparatus according to the present invention can be applied to systems of digital signal processing type or analog signal processing type.

INDUSTRIAL APPLICABILITY

The present invention is applicable to various kinds of information recording or memorizing apparatus such as computer memories, music information recording devices, and image information memorizing apparatus.

EXPLANATION OF SYMBOLS

DL1, DL2 . . . delay circuit, AM1–AM3 . . . amplifying circuit, AD1 . . . adder circuit, 1, 25 . . . disc reproducing apparatus, 2 . . . optical disc, 7 . . . collimator lens, 8, 14 . . . object lens, 9, 12 . . . beam splitter, 10, 14, 28 . . . light receiving element, 11 . . . transparent parallel flat plate, 13 . . . light shield plate, 15, 16, 29, 30, 31, 32 . . . subtract circuit, 17, 18, 33, 34, 35, 36 . . . amplifying circuit, 19, 20 . . . coil, 26 . . . light emitting diode, 41 . . . optical disc apparatus, 42 . . . optical disc, 46 . . . light source, 47 . . . lens system, 48 . . . grating, 49 . . . beam splitter, 50 . . . collimator lens, 51 . . . object lens, 53 . . . light beam spot correction means, 54 . . . transparent parallel flat plate, 57 . . . leaf spring, 59 . . . coil, 60 . . . magnet, 61 . . . skew detection sensor, 62 . . . photo reflector, 63 . . . reflector mirror, 64 . . . disc skew sensor, 65 . . . processing circuit, 71, 72 . . . photo reflector, 73 . . . light emitting element, 74 . . . photo detector, 75 . . . reflected light spot, 81 . . . photo detector, 82 . . . light emitting element, 83 . . . substrate, 84 . . . resin molded body, 85 . . . differential processing circuit, 90 . . . filtering means, 110, 1101, 1102, 111, 1111, 1112, 116, 119 . . . delay circuit, 112, 113, 114, 117, 1171, 1172, 1173, 120, 1201, 1202, 1203 . . . amplifying circuit, 115 . . . adder circuit, 1174, 1204, 118 . . . exchangeable circuit.

We claim:

1. An optical disc apparatus comprising:
    an optical disc for using a light beam incident through a transparent surface of the optical disc and focussed on an information recording surface of the optical disc to record desired information on the information recording surface and to reproduce information recorded on said information recording surface;
    a light source for irradiating said light beam;
    an object lens for focussing the light beam irradiated from said light source to the information recording surface; and
    a light beam spot correction means having a plate-like transparent member for being interposed in a bundle of said light beam between said light source and said object lens, or between the object lens and said optical disc, said light beam spot correcting means also having a photo reflector for detecting an inclination angle of the plate-like transparent member: wherein
    the transparent member inclination angle is changed according to a skew of the optical disc so as to correct the spot shape of the light beam focussed on the, information recording face for comatic aberration.

2. An optical disc apparatus for focussing and irradiating light beam of a light source on an information recording surface of an optical disc through an object lens and a transparent surface of the optical disc, comprising:
    a light beam spot correction means provided with a transparent flat plate placed in a light path of said light beam so as to change inclination of the transparent flat plate, said light beam spot correcting means also having a photo reflector for detecting an inclination angle of said transparent flat plate; and
    at least one pair of a coil and a magnet, magnetically related to said coil, placed to respectively one side of said transparent flat plate mid a fixing member opposed to the transparent flat plate side: wherein
    a current for said coil is generated according to an inclination angle of the optical disc from a standard mounting surface so as to adjust said inclination of said transparent flat plate so that said beam spot shape on the information recording face of the optical disc is corrected for comatic aberration.

3. An optical disc apparatus for focussing and irradiating light beam of a light source on an information recording surface of an optical disc through an object lens and a transparent surface of the optical disc, comprising:
    a light beam spot correction means having a transparent flat plate rotatably held around a first axis and a second axis perpendicularly crossing along a standard mounting surface of the optical disc, said transparent flat plate being arranged in a light path of said light beam, said light beam spot correcting means having a photo reflector for detecting an inclination angle of said transparent flat plate; and
    at least two pairs of a coil and a magnet magnetically related to each other, respective coil and magnet being placed at sides of the transparent flat plate and a fixing member opposed to the transparent flat plate: wherein
    a current for the coil is generated according to the inclination of the optical disc from the standard mounting surface so as to adjust an inclination of the transparent flat plate so that the beam spot shape on the information recording surface of the optical disc is corrected for comatic aberration.

4. An optical disc apparatus for focussing and irradiating light beam of a light source on an information recording surface of an optical disc through ant object lens and a transparent surface of the optical disc, said optical disc apparatus having a reproducing means comprising:

a light beam spot correction means having a transparent flat plate placed in a light path of the light beam so as to rotate around at least a predetermined first direction along a standard mounting surface of the optical disc, said light beam spot correcting means also having a photo reflector for detecting an inclination angle of said transparent flat plate;

at least one pair of a coil and a magnet magnetically related to each other and placed on respectively a side of the transparent flat plate and a fixing member is provided on a side of the transparent flat plate, and with a current in said coil controlling an inclination in a rotary direction of said transparent flat plate for correcting the shape of light beam spot for comatic aberration along the second direction perpendicular to the first direction on the information recording surface of the optical disc; and a reproducing means for changing a reflected light from the optical disc to an electric signal by means of a light receiving element divided into two regions so as to detect an inclination angle or skew of the optical disc relative to said second direction along the standard mounting surface of said optical disc, said reproducing means having a filtering means for filtering said electric signal on the basis of a filter coefficient restricted according to the skew amount of the optical disc, the result being outputted, and information recorded in the optical disc being reproduced according to the output.

5. The optical disc apparatus according to claim 4, wherein the filtering means comprises a multi-step transversal filter, and wherein a delay value $\tau_2$ of the delay circuit of said transversal filter is restricted by the following equation:

$$1.22 \frac{\lambda}{2NA} < \tau_2 < 2.23 \frac{\lambda}{2NA}$$

wherein, $\lambda$ is a wave length of the light source and NA is an aperture number of the object lens.

* * * * *

UNITED STATES PATENT AND TRADEMARK OFFICE
CERTIFICATE OF CORRECTION

PATENT NO. : 5,442,615
DATED : August 15, 1995
INVENTOR(S) : Kiyoshi Ohsato, Naoya Eguchi, Kamon Uemura It is certified that error appears in the above-indentified patent and that said Letters Patent is hereby corrected as shown below:

On the title page:

Attorney, Agent, or Firm - W. Patrick Benotsson; Limbach & Limbach

Should be corrected to:

Attorney, Agent, or Firm - W. Patrick --Bengtsson--; Limbach & Limbach

- In column 6, line 60, "2.33" should be --2.23--

- In column 10, equation (5), "$\approx$" should be --$\fallingdotseq$--

- In column 11, equations (7), (8) and (9), "$\approx$" should be --$\fallingdotseq$--

- In column 17, equation (14), "$\approx$" should be --$\fallingdotseq$--

Signed and Sealed this

Twentieth Day of February, 1996

Attest:

BRUCE LEHMAN

*Attesting Officer*  *Commissioner of Patents and Trademarks*